United States Patent
Ng et al.

(10) Patent No.: US 9,917,676 B2
(45) Date of Patent: Mar. 13, 2018

(54) HARQ PROCEDURE AND FRAME STRUCTURE FOR LTE CELLS ON UNLICENSED SPECTRUM

(71) Applicant: Samsung Electronics Co., Ltd., Suwon-si, Gyeonggi-do (KR)

(72) Inventors: Boon Loong Ng, Plano, TX (US); Aris Papasakellariou, Houston, TX (US); Thomas David Novlan, Dallas, TX (US); Ying Li, Bridgewater, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 142 days.

(21) Appl. No.: 14/728,666

(22) Filed: Jun. 2, 2015

(65) Prior Publication Data
US 2015/0365931 A1    Dec. 17, 2015

Related U.S. Application Data

(60) Provisional application No. 62/107,882, filed on Jan. 26, 2015, provisional application No. 62/010,934, filed on Jun. 11, 2014, provisional application No. 62/029,869, filed on Jul. 28, 2014.

(51) Int. Cl.
| | |
|---|---|
| *H04W 4/00* | (2009.01) |
| *H04L 1/18* | (2006.01) |
| *H04W 84/04* | (2009.01) |
| *H04W 72/04* | (2009.01) |
| *H04W 72/08* | (2009.01) |

(52) U.S. Cl.
CPC .......... *H04L 1/1812* (2013.01); *H04L 1/1887* (2013.01); *H04L 1/1893* (2013.01); *H04L 1/1822* (2013.01); *H04L 1/1861* (2013.01); *H04L 1/1896* (2013.01); *H04W 72/0453* (2013.01); *H04W 72/082* (2013.01); *H04W 84/042* (2013.01)

(58) Field of Classification Search
CPC ............................ H04L 1/1812; H04L 1/1887
USPC ......................................................... 370/329
See application file for complete search history.

(56) References Cited

U.S. PATENT DOCUMENTS

| | | |
|---|---|---|
| 2013/0272187 A1 | 10/2013 | Malladi et al. |
| 2014/0036818 A1 | 2/2014 | Koskela et al. |
| 2014/0036853 A1 | 2/2014 | Kim et al. |

(Continued)

OTHER PUBLICATIONS

International Search Report, dated Sep. 25, 2015, in connection with Application No. PCT/KR2015/005881, 3 pages.

(Continued)

*Primary Examiner* — Samina Choudhry

(57) ABSTRACT

A user equipment (UE) is configured to perform a Hybrid Automatic Repeat Request (HARQ) in an un-licensed system. The UE includes at least one antenna configured to communicate with a base station. The UE also includes processing circuitry. The processing circuitry is configured to: send and receive data through the at least one antenna, in response to failing to decode a transport block transmitted by a first downlink carrier, transmit a negative acknowledgement message to the base station, and receive a re-transmission of the transport block from a second downlink carrier. The first downlink carrier comprises a unlicensed spectrum carrier and the second downlink carrier is different from the first downlink carrier.

18 Claims, 21 Drawing Sheets

(56) References Cited

U.S. PATENT DOCUMENTS

| | | | |
|---|---|---|---|
| 2014/0044105 A1 | 2/2014 | Bontu et al. | |
| 2014/0092784 A1 | 4/2014 | Khayrallah et al. | |
| 2015/0092703 A1* | 4/2015 | Xu .......................... | H04L 5/003 370/329 |
| 2015/0103782 A1* | 4/2015 | Xu .......................... | H04L 5/001 370/329 |
| 2015/0349931 A1* | 12/2015 | Damnjanovic ....... | H04L 5/0007 370/280 |

OTHER PUBLICATIONS

Written Opinion of the International Searching Authority, dated Sep. 25, 2015, in connection with Application No. PCT/KR2015/005881, 6 pages.

* cited by examiner

HARQ PROCEDURE AND FRAME STRUCTURE FOR LTE CELLS ON UNLICENSED SPECTRUM

CROSS-REFERENCE TO RELATED APPLICATION(S) AND CLAIM OF PRIORITY

The present application claims priority to U.S. Provisional Patent Application Ser. No. 62/107,882 filed Jan. 26, 2015, entitled "HARQ Procedure for LTE Cells on Unlicensed Spectrum," U.S. Provisional Patent Application Ser. No. 62/010,934 filed Jun. 11, 2014, entitled "HARQ Procedure for LTE Cells on Unlicensed Spectrum" and U.S. Provisional Patent Application Ser. No. 62/029,869 filed Jul. 28, 2014, entitled "Methods and Apparatus of LTE System on Unlicensed Spectrum." The content of the above-identified patent documents are incorporated herein by reference.

TECHNICAL FIELD

The present application relates generally to wireless communications systems and, more specifically, to a system and apparatus for use on un-licensed spectrums.

BACKGROUND

A communication system includes a DownLink (DL) that conveys signals from transmission points such as Base Stations (BSs) or eNodeBs to User Equipments (UEs) and an UpLink (UL) that conveys signals from UEs to reception points such as eNodeBs. A UE, also commonly referred to as a terminal or a mobile station, may be fixed or mobile and may be a cellular phone, a personal computer device, and the like. An eNodeB, which is generally a fixed station, may also be referred to as an access point or other equivalent terminology.

DL signals include data signals conveying information content, control signals conveying DL Control Information (DCI), and Reference Signals (RS), which are also known as pilot signals. An eNodeB transmits data information or DCI through respective Physical DL Shared CHannels (PDSCHs) or Physical DL Control CHannels (PDCCHs). Possible DCI formats used for downlink assignment include DCI format 1A, 1B, 1C, 1D, 2, 2A, 2B, 2C and 2D. A UE can be configured with a transmission mode that determines the downlink unicast reception method for the UE. For a given transmission mode, a UE can receive unicast downlink assignment using DCI format 1A and one of DCI format 1B, 1D, 2, 2A, 2B, 2C or 2D. An eNodeB transmits one or more of multiple types of RS including a UE-Common RS (CRS), a Channel State Information RS (CSI-RS), and a DeModulation RS (DMRS). A CRS is transmitted over a DL system BandWidth (BW) and can be used by UEs to demodulate data or control signals or to perform measurements. To reduce CRS overhead, an eNodeB may transmit a CSI-RS with a smaller density in the time and/or frequency domain than a CRS. For channel measurement, Non-Zero Power CSI-RS (NZP CSI-RS) resources can be used. For Interference Measurement Resources (IMRs), CSI Interference Measurement (CSI-IM) resources associated with a Zero Power CSI-RS (ZP CSI-RS) can be used. A UE can determine the CSI-RS transmission parameters through higher layer signaling from an eNodeB. DMRS is transmitted only in the BW of a respective PDSCH and a UE can use the DMRS to demodulate information in a PDSCH.

SUMMARY

In a first embodiment, a user equipment (UE) is provided. The UE includes at least one antenna configured to communicate with a base station. The UE also includes processing circuitry. The processing circuitry is configured to: send and receive data through the at least one antenna, in response to failing to decode a transport block transmitted by a first downlink carrier, transmit a negative acknowledgement message to the base station, and receive a re-transmission of the transport block from a second downlink carrier. The first downlink carrier comprises an unlicensed spectrum carrier and the second downlink carrier is different from the first downlink carrier.

In a second embodiment, a user equipment (UE) is provided. The UE includes at least one antenna configured to communicate with a base station. The UE also includes processing circuitry. The processing circuitry is configured to: send and receive data control information through the at least one antenna, and receive the data and control information in an unlicensed frame on an unlicensed spectrum carrier. The unlicensed frame comprising a number of downlink (DL) sub-frames followed by special sub-frame followed by an uplink (UL) sub-frame.

Other technical features may be readily apparent to one skilled in the art from the following figures, descriptions, and claims. Definitions for other certain words and phrases are provided throughout this patent document. Those of ordinary skill in the art should understand that in many if not most instances, such definitions apply to prior as well as future uses of such defined words and phrases.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be hound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The following documents and standards descriptions are hereby incorporated into the present disclosure as if fully set forth herein: 3GPP TS 36.211 v11.2.0, "E-UTRA, Physical channels and modulation" (REF 1); 3GPP TS 36.212 v11.2.0, "E-UTRA, Multiplexing and Channel coding" (REF 2); 3GPP TS 36.213 v11.2.0, "E-UTRA, Physical Layer Procedures" (REF 3); 3GPP TR 36.872 V12.0.0, "Small cell enhancements for E-UTRA and E-UTRAN—Physical layer aspects" (REF 4); 3GPP TS 36.133 v11.7.0, "E-UTRA Requirements for support of radio resource management" (REF 5); RP-141664, "Study on Licensed-Assisted Access using LTE", Ericsson, Qualcomm, Huawei, Alcatel-Lucent (REF 6); ETSI EN 301 893 V1.7.1 (2012-06), Harmonized European Standard, "Broadband Radio Access Networks (BRAN), 5 GHz high performance RLAN" (REF 7); and 3GPP TS 36.321 V12.4.0 (2014-12), "E-UTRA, Medium Access Control (MAC) protocol specification" (REFS). The contents of which are hereby incorporated by reference in their entirety.

Figure 1A:
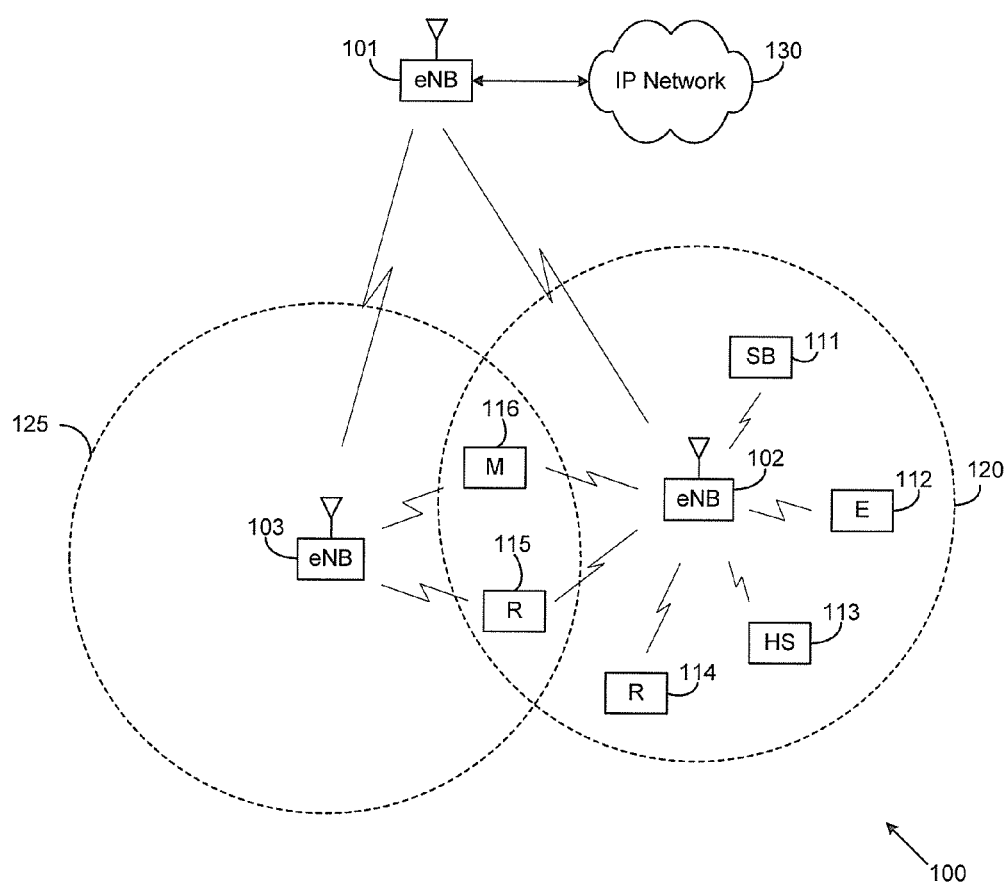
FIG. 1A illustrates an example wireless network according to this disclosure.

FIG. 1A illustrates an example wireless network 100 according to this disclosure. The embodiment of the wireless network 100 shown in FIG. 1A is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" (BS) or "access point" (AP). For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," "mobile terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, Long Term Evolution (LTE), Long Term Evolution-Advanced (LTE-A), Worldwide Interoperability for Microwave Access (WiMAX), or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of eNB 101, eNB 102 or eNB 103 is configured to support Hybrid Automatic Repeat Request (HARQ) of LTE cells on an unlicensed spectrum. In addition, one or more of eNB 101, eNB 102 or eNB 103 is configured to support unlicensed LTE frame structures for an unlicensed spectrum for cell discovery.

Although FIG. 1A illustrates one example of a wireless network 100, various changes may be made to FIG. 1A. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, one or more of the eNB 101, 102, or 103 could provide access to other or additional external networks, such as external telephone networks or other types of data networks.

Figure 1B:
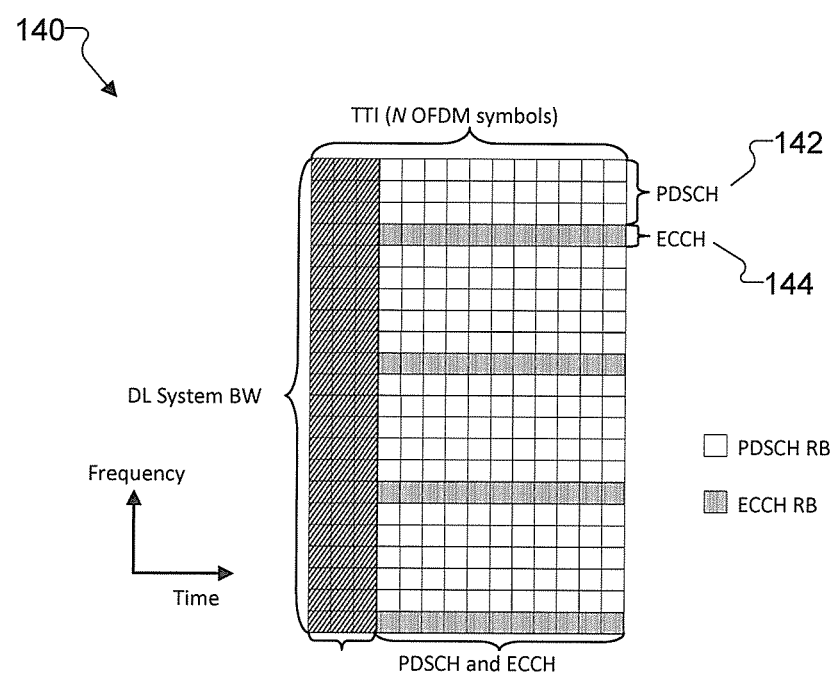
FIG. 1B illustrates a structure of a DL Transmission Time Interval (TTI) according to this disclosure.

FIG. 1B illustrates a structure of a DL Transmission Time Interval (TTI) according to this disclosure. The embodiment of the DL Transmission TTI 140 shown in FIG. 1b is for illustration only. Other embodiments could be used without departing from the scope of the present disclosure.

DL signaling uses Orthogonal Frequency Division Multiplexing (OFDM) and a DL TTI includes N=14 OFDM symbols in the time domain and K Resource Blocks (RBs) in the frequency domain. A first type of Control CHannels (CCHs) is transmitted in a first $N_1$ OFDM symbols 110 (including no transmission, $N_1$=0). A remaining N-$N_1$ OFDM symbols are used primarily for transmitting PDSCHs 142 and, in some RBs of a TTI, for transmitting a second type of CCHs (ECCHs) 144.

An eNB, such as the eNB 103, also transmits Primary Synchronization Signals (PSS) and Secondary Synchronization Signals (SSS), so that a UE, such as UE 116, can synchronize with the eNodeB and perform cell identification. There are 504 unique physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$; is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. Detecting a PSS enables the UE 116 to determine the physical-layer identity as well as the slot timing of the cell transmitting the PSS. Detecting a SSS enables the UE 116 to determine the radio frame timing, the physical-layer cell identity, the cyclic prefix length as well as the cell uses Frequency Division Duplexing (FDD) or a Time Division Duplexing (TDD) scheme.

Figure 2A:
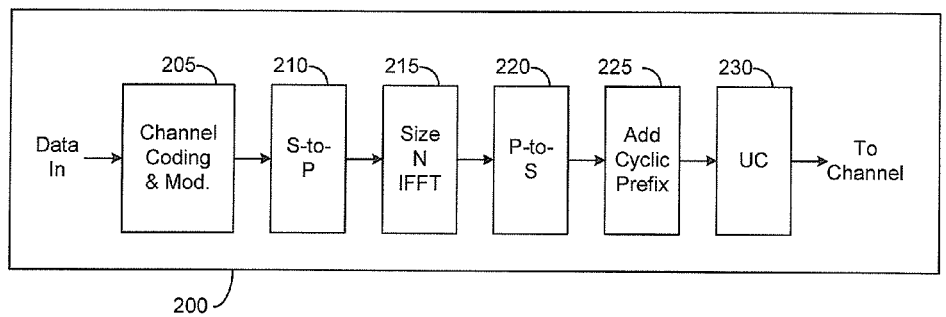
FIGS. 2A and 2B illustrate example wireless transmit and receive paths according to this disclosure.
Figure 2B:
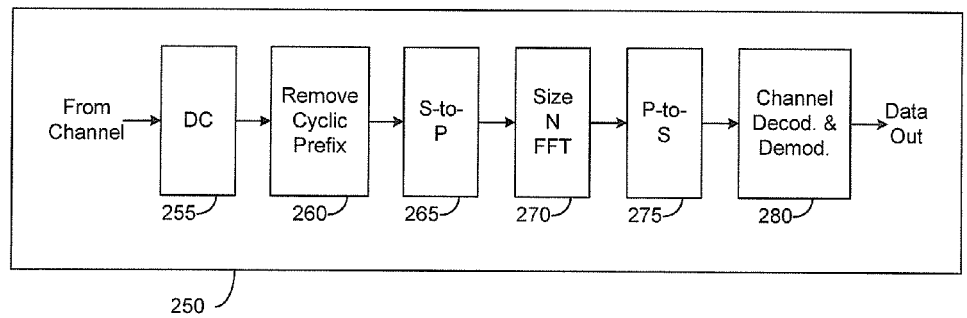

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In certain embodiments, the transmit path 200 and receive path 250 are configured to support HARQ of LTE cells on an unlicensed spectrum. In certain embodiments, the transmit path 200 and receive path 250 are configured to support unlicensed LTE frame structures for LTE on an unlicensed spectrum.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
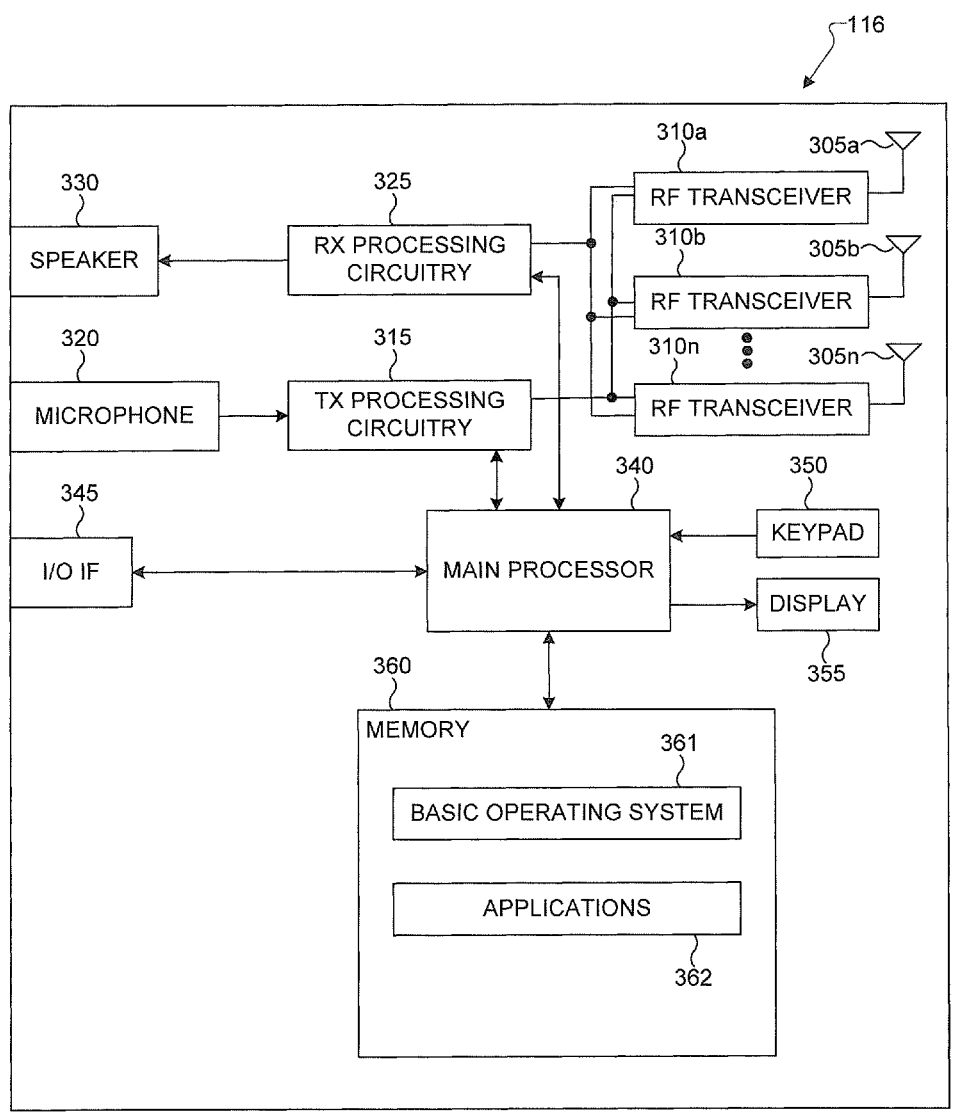
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1A could have the same or similar configuration. However, UEs come in a wide variety of configurations, and FIG. 3 does not limit the scope of this disclosure to any particular implementation of a UE.

The UE 116 includes multiple antennas 305a-305n, radio frequency (RF) transceivers 310a-310n, transmit (TX) processing circuitry 315, a microphone 320, and receive (RX) processing circuitry 325. The TX processing circuitry 315 and RX processing circuitry 325 are respectively coupled to each of the RF transceivers 310a-310n, for example, coupled to RF transceiver 310a, RF transceiver 210b through to a N$^{th}$ RF transceiver 310n, which are coupled respectively to antenna 305a, antenna 305b and an N$^{th}$ antenna 305n. In certain embodiments, the UE 116 includes a single antenna 305a and a single RF transceiver 310a. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceivers 310a-310n receive, from respective antennas 305a-305n, an incoming RF signal transmitted by an eNB or AP of the network 100. In certain embodiments, each of the RF transceivers 310a-310n and respective antennas 305a-305n is configured for a particular frequency band or technological type. For example, a first RF transceiver 310a and antenna 305a can be configured to communicate via a near-field communication, such as BLUETOOTH®, while a second RF transceiver 310b and antenna 305b can be configured to communicate via a IEEE 802.11 communication, such as Wi-Fi, and another RF transceiver 310n and antenna 305n can be configured to communicate via cellular communication, such as 3G, 4G, 5G, LTE, LTE-A, or WiMAX. In certain embodiments, one or more of the RF transceivers 310a-310n and respective antennas 305a-305n is configured for a particular frequency band or same technological type. The RF transceivers 310a-310n down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceivers 310a-310n receive the outgoing processed baseband or IF signal from the TX processing circuitry 315 and up-converts the baseband or IF signal to an RF signal that is transmitted via one or more of the antennas 305a-305n.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceivers 310a-310n, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for HARQ on LTE cells on an unlicensed spectrum or to utilize unlicensed LTE frame structures for LTE on an unlicensed spectrum. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The user of the UE 116 can use the keypad 350 to enter data into the UE 116. The display 355 can be a liquid crystal display or other display capable of rendering text or at least limited graphics, such as from web sites, or a combination thereof.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
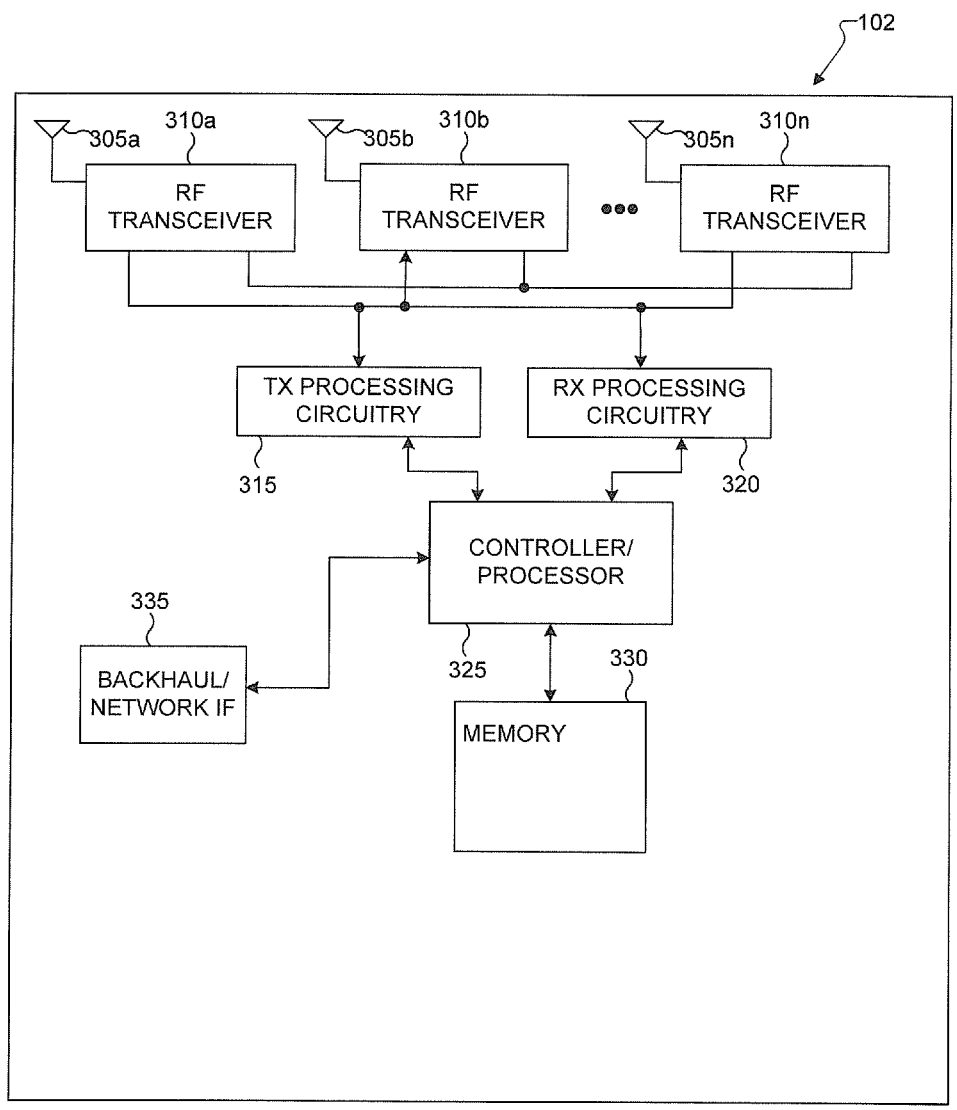
FIG. 4 illustrates an example access point according to this disclosure.

FIG. 4 illustrates an example access point according to this disclosure. The embodiment of the access point (AP) shown in FIG. 4 is for illustration only. An LTE cell, LTE-U/LAA cell, or one or more of the eNBs of FIG. 1A could have the same or similar configuration. However, APs and eNBs come in a wide variety of configurations, and FIG. 4 does not limit the scope of this disclosure to any particular implementation of an eNB.

The AP 400 includes multiple antennas 405a-405n, multiple RF transceivers 410a-410n, transmit (TX) processing circuitry 415, and receive (RX) processing circuitry 420. The TX processing circuitry 415 and RX processing circuitry 420 are respectively coupled to each of the RF transceivers 410a-410n, for example, coupled to RF transceiver 410a, RF transceiver 410b through to a $N^{th}$ RF transceiver 410n, which are coupled respectively to antenna 405a, antenna 405b and an $N^{th}$ antenna 405n. In certain embodiments, the AP 400 includes a single antenna 405a and a single RF transceiver 410a. The AP 400 also includes a controller/processor 425, a memory 430, and a backhaul or network interface 435.

The RF transceivers 410a-410n receive, from the antennas 405a-405n, incoming RF signals, such as signals transmitted by UEs or other eNBs. The RF transceivers 410a-410n down-convert the incoming RF signals to generate IF or baseband signals. The IF or baseband signals are sent to the RX processing circuitry 420, which generates processed baseband signals by filtering, decoding, and/or digitizing the baseband or IF signals. The RX processing circuitry 420 transmits the processed baseband signals to the controller/processor 425 for further processing.

The TX processing circuitry 415 receives analog or digital data (such as voice data, web data, e-mail, or interactive video game data) from the controller/processor 425. The TX processing circuitry 415 encodes, multiplexes, and/or digitizes the outgoing baseband data to generate processed baseband or IF signals. The RF transceivers 410a-410n receive the outgoing processed baseband or IF signals from the TX processing circuitry 415 and up-converts the baseband or IF signals to RF signals that are transmitted via the antennas 405a-405n.

The controller/processor 425 can include one or more processors or other processing devices that control the overall operation of the AP 400. For example, the controller/processor 425 could control the reception of forward channel signals and the transmission of reverse channel signals by the RF transceivers 410a-410n, the RX processing circuitry 420, and the TX processing circuitry 415 in accordance with well-known principles. The controller/processor 425 could support additional functions as well, such as more advanced wireless communication functions. For instance, the controller/processor 425 could support beam forming or directional routing operations in which outgoing signals from multiple antennas 405a-405n are weighted differently to effectively steer the outgoing signals in a desired direction. Any of a wide variety of other functions could be supported in the AP 400 by the controller/processor 425. In some embodiments, the controller/processor 425 includes at least one microprocessor or microcontroller.

The controller/processor 425 is also capable of executing programs and other processes resident in the memory 430, such as a basic OS. The controller/processor 425 can move data into or out of the memory 430 as required by an executing process.

The controller/processor 425 is also coupled to the backhaul or network interface 435. The backhaul or network interface 435 allows the AP 400 to communicate with other devices or systems over a backhaul connection or over a network. The interface 435 could support communications over any suitable wired or wireless connection(s). For example, when the AP 400 is implemented as part of a cellular communication system (such as one supporting 5G, LTE, or LTE-A), the interface 435 could allow the AP 400 to communicate with other eNBs over a wired or wireless backhaul connection. When the AP 400 is implemented as an access point, the interface 435 could allow the AP 400 to communicate over a wired or wireless local area network or over a wired or wireless connection to a larger network (such as the Internet). The interface 435 includes any suitable structure supporting communications over a wired or wireless connection, such as an Ethernet or RF transceiver.

The memory 430 is coupled to the controller/processor 425. Part of the memory 430 could include a RAM, and another part of the memory 430 could include a Flash memory or other ROM.

As described in more detail below, the transmit and receive paths of the AP 400 (implemented using the RF transceivers 410a-410n, TX processing circuitry 415, or RX processing circuitry 420, or a combination thereof) support operations for HARQ on LTE cells on an unlicensed spectrum or support unlicensed LTE frame structures for LTE on an unlicensed spectrum for cell discovery.

Although FIG. 4 illustrates one example of an AP 400, various changes may be made to FIG. 4. For example, the AP 400 could include any number of each component shown in FIG. 4. As a particular example, an access point could include a number of interfaces 435, and the controller/processor 425 could support routing functions to route data between different network addresses. As another particular example, while shown as including a single instance of TX processing circuitry 415 and a single instance of RX processing circuitry 420, the AP 400 could include multiple instances of each (such as one per RF transceiver).

Figure 5:
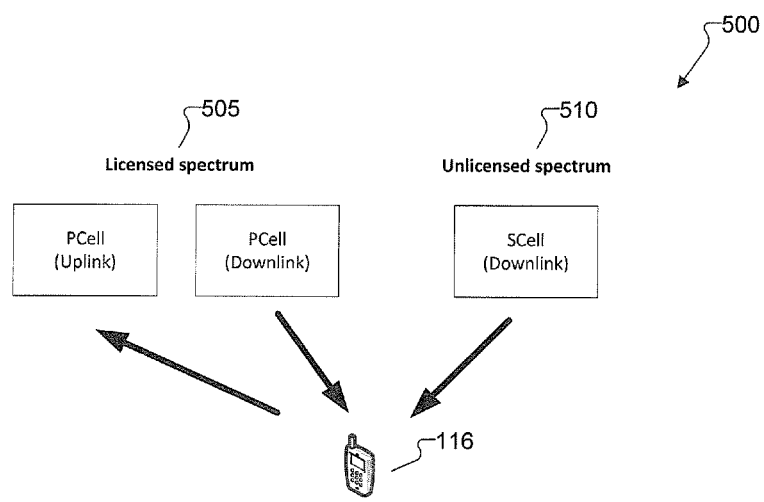
FIG. 5 illustrates carrier aggregation of a carrier on licensed spectrum and a carrier on an unlicensed spectrum according to this disclosure.

FIG. 5 illustrates carrier aggregation of a carrier on licensed spectrum and a carrier on an unlicensed spectrum according to this disclosure. The example of the carrier aggregation 500 shown in FIG. 5 is for illustration only. Other examples could be illustrated without departing from the scope of the present disclosure.

It is possible to deploy LTE radio access technology (RAT) on an unlicensed frequency spectrum. One example is known as LTE-Unlicensed (LTE-U). Another example is known as Licensed Assisted Access (LAA) using LTE. LTE-U/LAA is used as example in this disclosure for ease of exposition. Other examples of LTE on unlicensed frequency spectrum can be used without departing from the scope of the present disclosure.

A possible deployment scenario for LTE-U/LAA is to deploy an LTE-U/LAA carrier as a part of carrier aggregation, where an LTE-U/LAA carrier is aggregated with another carrier on a licensed spectrum, as shown in the example illustrated in FIG. 2. In a typical arrangement, the carrier on the licensed spectrum 505 is assigned as the Primary Cell (PCell) for uplink and PCell for downlink. In the example shown in FIG. 2, a PCell for uplink and a PCell for downlink are illustrated; however, a single PCell can be utilized. The carrier on the unlicensed spectrum 510 is assigned as the Secondary Cell (SCell) for UE 116. In the example shown in FIG. 2, the LTE-U/LAA cell, that is the cell on the unlicensed spectrum 510, includes a downlink carrier without an uplink carrier.

Since other RATs may be operating on the same unlicensed spectrum 510 as the LTE-U/LAA carrier, there is a need to enable co-existence of the other RAT with LTE-U/LAA on an unlicensed frequency spectrum. One possible method is to create a Time-Division-Multiplexing (TDM) transmission pattern between a LTE-U/LAA transmitter and transmitters of the other RATs, such as a Wi-Fi Access Point. Another possible method is to apply a Listen-Before-Talk channel access mechanism such as defined in REF 7

Figure 6:
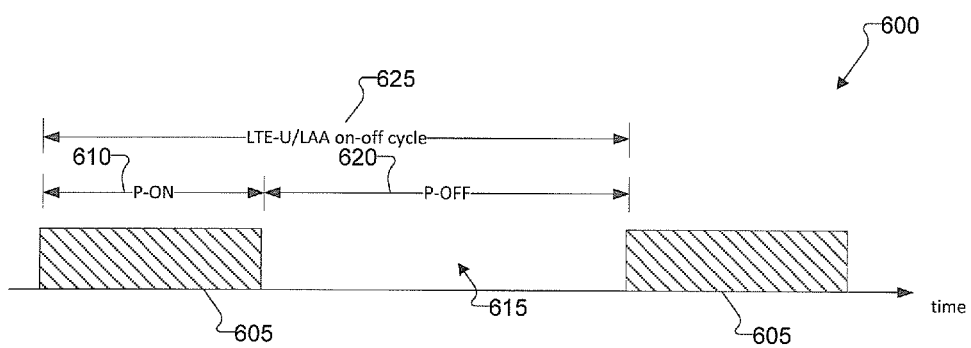
FIG. 6 illustrates example of a TDM transmission pattern for a LTE-Unlicensed (LTE-U)/Licensed Assisted Access (LAA) downlink (DL) carrier according to this disclosure.

FIG. 6 illustrates example of a TDM transmission pattern for a LTE-U/LAA downlink carrier according to this disclosure. The example of the TDM transmission pattern 600 for a LTE-U/LAA downlink carrier shown in FIG. 6 is for illustration only. Other examples could be illustrated without departing from the scope of the present disclosure.

The LTE-U/LAA carrier is ON 605 for a duration P-ON 610 and is OFF 615 for a duration P-OFF 620. When the LTE-U/LAA carrier is ON 605, LTE signals are transmitted including at least one of: PSS, SSS, CRS, DMRS, PDSCH, PDCCH, EPDCCH or CSI-RS; whereas when the LTE-U/LAA carrier if OFF 615, the LTE-U/LAA cell does not transmit any signals, with a possible exception of a discovery reference signal with a relatively long transmission periodicity. However, for simplicity it is assumed hereafter that nothing is transmitted by the LTE-U/LAA cell if it is OFF 615. An LTE-U/LAA on-off cycle 625 can be defined to be P-ON+P-OFF. The duration of the LTE-U/LAA on-off cycle 625 can be fixed or semi-statically configured according to a listen-before-talk (LBT) protocol. The duration of LTE-U/LAA on-off cycle 625 can be a few milliseconds (ms). The ON period (or maximum channel occupancy time) can have a maximum duration as defined by regulation, such as 10 ms, as defined in REF 7. The length, e.g., duration, for P-ON 610 can be adjusted or adapted by a scheduler of the LTE-U/LAA according to the buffer status or traffic pattern at the LTE-U/LAA carrier and a co-existence metric requirement or target. Wi-Fi APs, or other RAT transmitters, can utilize the P-OFF 620 period for transmissions since the P-OFF 620 period is free from LTE-U/LAA interference. The measurement for the co-existence metric can be performed by the LTE-U/LAA cell during the off period of the LTE-U/LAA carrier to estimate the radio activity level of the spectrum. The adaptation of P-ON 605 and P-OFF 615 can be performed per LTE-U/LAA on-off cycle 625 or per multiple LTE-U/LAA on-off cycles 625. Signaling of ON 605 or OFF 615 of LTE-U/LAA cell to UE 116 can be done using SCell MAC activation and deactivation command, or can be based on UE autonomous detection. SCell MAC activation command can be sent via another serving cell such as the PCell. SCell MAC deactivation command can be sent from any serving cell, including the LTE-U/LAA cell. When an SCell is deactivated, UE 116 does not receive data on the SCell. If a listen-before-talk (LBT) protocol is applied, there can be an idle period after the end of channel occupancy, where e.g. for a frame-based equipment, a minimum idle period of e.g. 5% of the channel occupancy time can be specified (e.g. as defined in REF 7). The idle period can include a Clear Channel Assessment (CCA) period towards the end of the idle period, where carrier sensing is performed by the UE. Other LBT protocol such as that specified for Load Based Equipment is also possible, as defined in REF 7

In One Embodiment (Embodiment 1—LTE-U/LAA HARQ Procedure)

Figure 7:
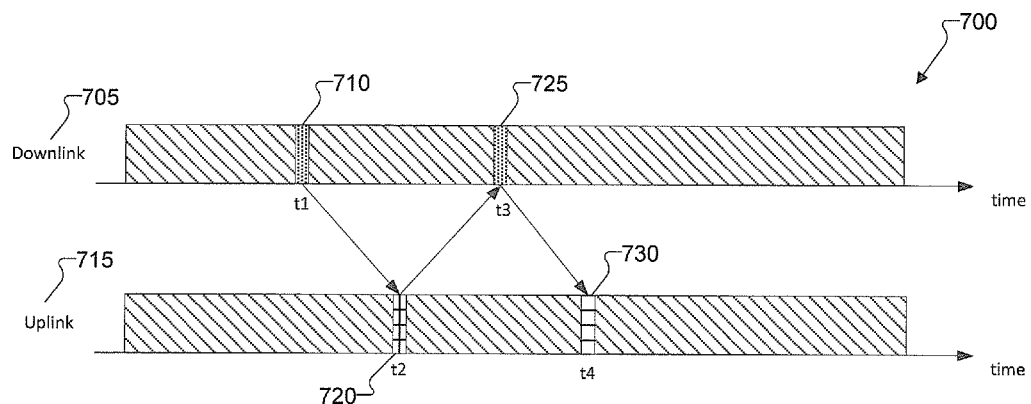
FIG. 7 illustrates an example of a downlink Hybrid Automatic Repeat Request (HARQ) process according to this disclosure.

FIG. 7 illustrates an example of a downlink HARQ process according to this disclosure. The example of the HARQ process 700 shown in FIG. 7 is for illustration only. Other examples could be illustrated without departing from the scope of the present disclosure.

In a wireless communication such as the LTE, HARQ is supported to enable retransmission of transport block by a transmitter that has failed to be decoded by a receiver. HARQ is supported for both downlink (DL) and uplink (UL).

On a DL carrier 705, a transport block 710 is transmitted by an eNB 102 using a Physical Downlink Shared Channel (PDSCH) to UE 116 at time t1. On an UL carrier 715, the UE 116 sends a NACK 720 on a Physical Uplink Control Channel (PUCCH) or Physical Uplink Shared Channel (PUSCH) at time t2 to the eNB 102 when the transport block 710 fails to be decoded by UE 116. The eNB 102 can then respond to the NACK 720 message by retransmitting the transport block 725 using PDSCH in time t3. The retransmitted transport block 725 can be the same set of coded bits, for chase combining, or a different set of coded bits, for incremental redundancy. Upon receiving transport block 725, UE 116 can then perform soft combining of the transport block 725 with the data in the soft buffer from the previous transport block 710 and attempt to decode the combined data. If decoding is successful, UE 116 sends an ACK 730 on PUCCH or PUSCH in t4; otherwise UE 116 can request for retransmission again by sending a NACK. There can be a number of retransmissions for a HARQ process and there can be multiple HARQ processes running in parallel for a UE per carrier. Similar HARQ process can also occur in the UL 715 where UE 116 is the transmitter of data in PUSCH and the eNB 102 is the receiver of data and transmitter of the corresponding ACK/NACK using PHICH or PDCCH/EPDCCH. Another key difference between the DL HARQ process and the UL HARQ process for LTE Rel-8-12 is that DL HARQ process is asynchronous while the UL HARQ process is synchronous.

When the DL carrier is located in an unlicensed spectrum, and when a transmission of a transport block occurs just before the LTE-U/LAA cell is OFF 615 and fails to be decoded by UE 116, retransmission of the failed transport block is not possible during the off period 620. For the asynchronous DL HARQ process, a long waiting period can elapse before the LTE-U/LAA cell can transmit data again, which can result in excessive or intolerable latency for packet delivery. For the synchronous UL HARQ process, UE 116 would be denied the opportunity to retransmit UL data according to the predefined UL HARQ timing during the off period of LTE-U/LAA cell.

Figure 8:
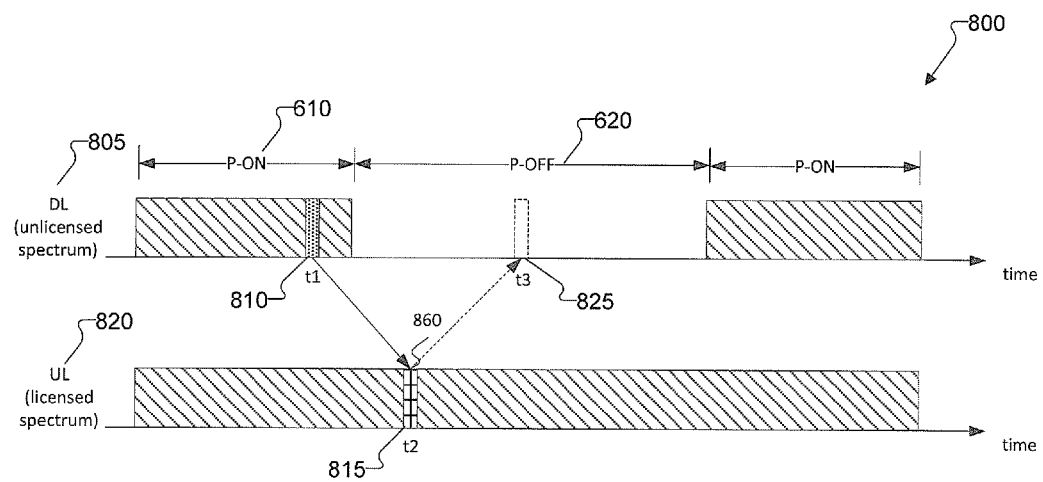
FIG. 8 illustrates an example of a DL HARQ process in which retransmission of the transport block is disrupted by an off period of the LTE-Unlicensed (LTE-U)/Licensed Assisted Access (LAA) downlink (DL) carrier according to this disclosure.

FIG. 8 illustrates an example of a DL HARQ process in which retransmission of the transport block is disrupted by an off period of the LTE-U/LAA DL carrier according to this disclosure. The embodiment of the DL HARQ process 800 shown in FIG. 8 is for illustration only. Other embodiments could be used without departing from the scope of the present disclosure.

On a DL carrier 805 deployed on an unlicensed spectrum, a transport block 810 is transmitted by an eNB 102 using PDSCH to UE 116 at time t1 belonging to a first P-ON 610 period. The UE 116 sends a NACK 820 on PUCCH or PUSCH at time t2 on an UL carrier 820 deployed on a licensed spectrum to the eNB 102 when the transport block 810 fails to be decoded by the UE 116. However, the retransmission of the transport block 825 is disrupted or prevented due to the LTE-U/LAA DL P-OFF 620 period. The problem is similar for the UL HARQ process if the UL carrier is deployed on an unlicensed spectrum.

In a first approach, if the LTE-U/LAA DL stops transmissions or goes into OFF 615 or a dormant state while the UE 116 is waiting for retransmission of a transport block, the HARQ process for the transport block is considered terminated, or retransmission of the transport block is considered ended, that is, the UE 116 can flush the DL HARQ buffer or the UE 116 can consider the next received transport block of the same HARQ process on the DL carrier when the P-ON 610 period returns to be a new transport block or new transmission. Alternatively, an ACK for the transport block is sent from the physical layer to the higher layer. An advantage of the first approach is that it is a simple procedure and if P-ON 610 is long, such as hundreds of milliseconds (ms), the performance loss from not able to receive retransmissions may not be significant. One example of the first approach is illustrated in FIG. 9.

Figure 9:
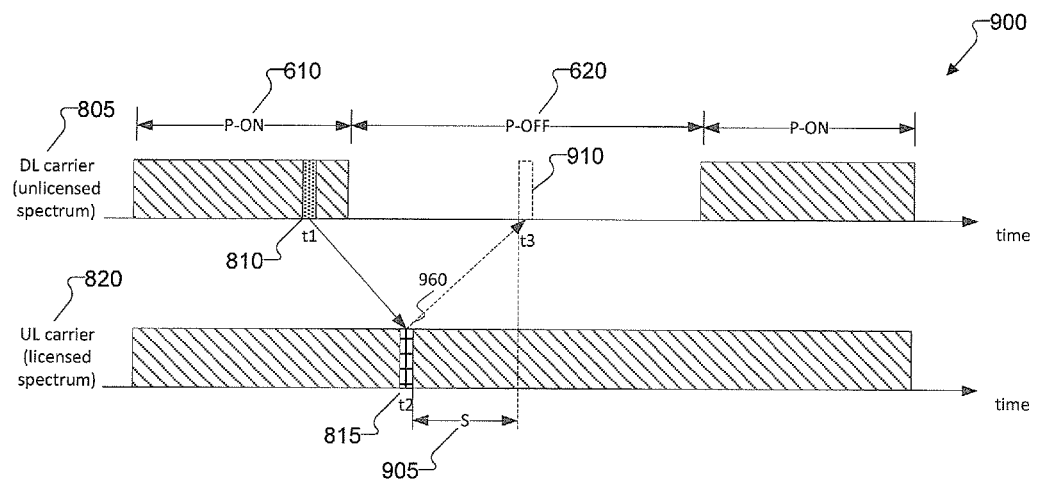
FIGS. 9 and 10 illustrate examples of a first approach for a DL HARQ process according to this disclosure.

FIG. 9 illustrates an example of a first approach for a DL HARQ process according to this disclosure. The embodiment of the first approach 900 for the DL HARQ process shown in FIG. 9 is for illustration only. Other embodiments could be used without departing from the scope of the present disclosure.

Figure 10:
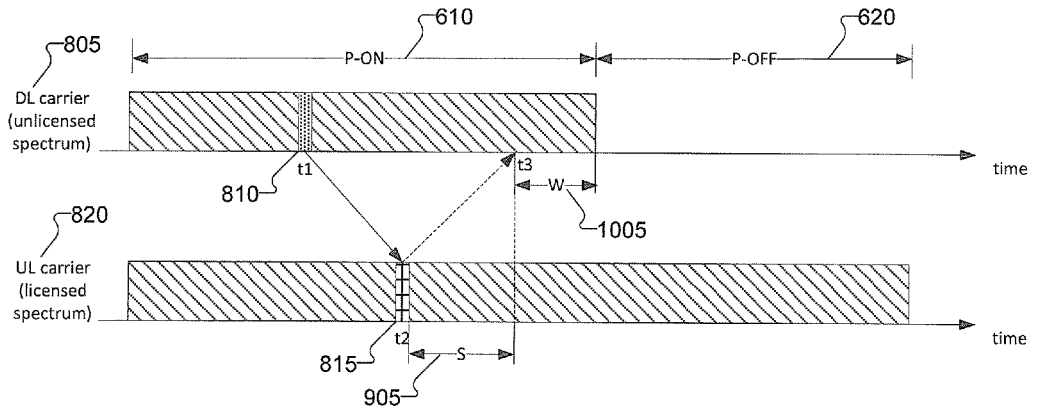

The UE 116 begins to wait for a retransmission from the eNB 102 S ms 905, for example S=0, 1, 2, 3 or 4, after sending NACK 815 for a transport block 810, which has not been successfully decoded. Since the sub-frame 910 at t2+S is OFF 615, namely in P-OFF 620 period, or equivalently, PDSCH is not assumed present by the UE 116, the UE 116 considers the HARQ process for the transport block to be terminated. In another example, the time S can be from the instance the DL carrier becomes OFF 615. Another example of the first approach is illustrated in FIG. 10 in which the UE 116 waits for a W period 1005 before the DL carrier 805 becomes OFF 620, in the P-OFF 620 period, and the UE 116 then considers the HARQ process for the transport block to be terminated.

Figure 11:
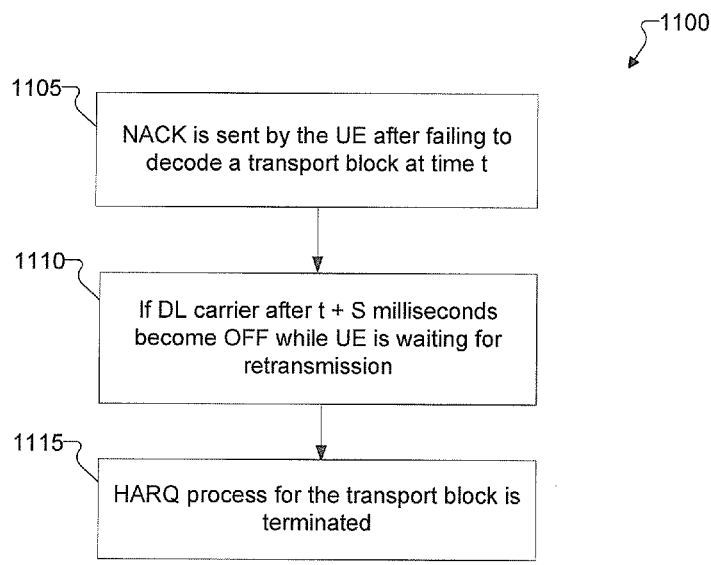
FIG. 11 illustrates user equipment (UE) procedure for the first approach according to this disclosure.

FIG. 11 illustrates UE procedure 1100 for the first approach according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry or a transmitter chain in, for example, a UE.

In block 1105, the UE 116 transmits a NACK in response to a failure to decode a transport block at time t. In block 1110, after sending NACK, the UE 116 begins to wait for a retransmission from eNB 102 for S ms. When the sub-frame at t+S is OFF 615, namely in a P-OFF 620 period, or equivalently, PDSCH is not assumed present by the UE 116, the UE 116 considers the HARQ process for the transport block to be terminated in block 1115.

Figure 12:
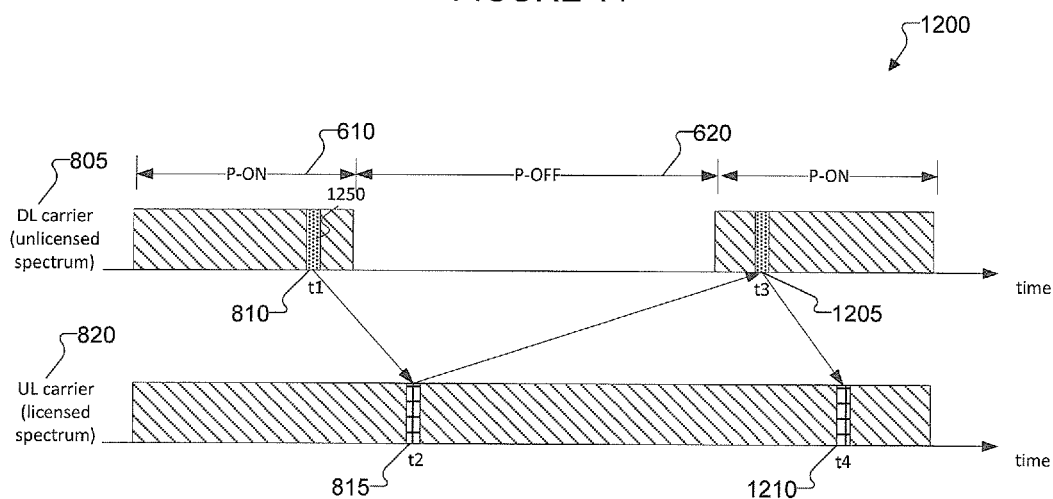
FIGS. 12 and 13 illustrate examples of a second approach for a DL HARQ process according to this disclosure.

FIG. 12 illustrates an example of a second approach for a DL HARQ process according to this disclosure. The embodiment of the second approach 1200 for the DL HARQ process shown in FIG. 12 is for illustration only. Other embodiments could be used without departing from the scope of the present disclosure.

In a second approach, if the LTE-U/LAA DL 805 stops transmissions or goes into OFF 615 or dormant state while the UE 116 is waiting for retransmission of a transport block, the HARQ process for the transport block is temporarily suspended, that is, UE 116 maintains the DL data 805 in the soft buffer or HARQ buffer, in other words, the UE 116 does not flush the HARQ buffer. After the LTE-U/LAA DL is ON 605 again, the HARQ process 1200 continues and the transport block is retransmitted. An advantage of the second approach is that performance loss from not able to receive retransmission can be avoided. This is particularly important in case P-ON 610 is short, such as ≤10 ms, or tens of ms.

In the example shown in FIG. 12, the UE 116 sends NACK 815 at t2 for a transport block 810 that was sent at t1 and which has not been successfully decoded. The eNB 102 suspends transmission while the DL 805 is in P-OFF 620 and can retransmit the transport block 1205 at t3 after the DL 805 is ON 605, in P-ON 610, again. The UE 116 sends ACK 1210 at t4 when the decoding of transport block 1205 after soft combining is successful.

Figure 13:
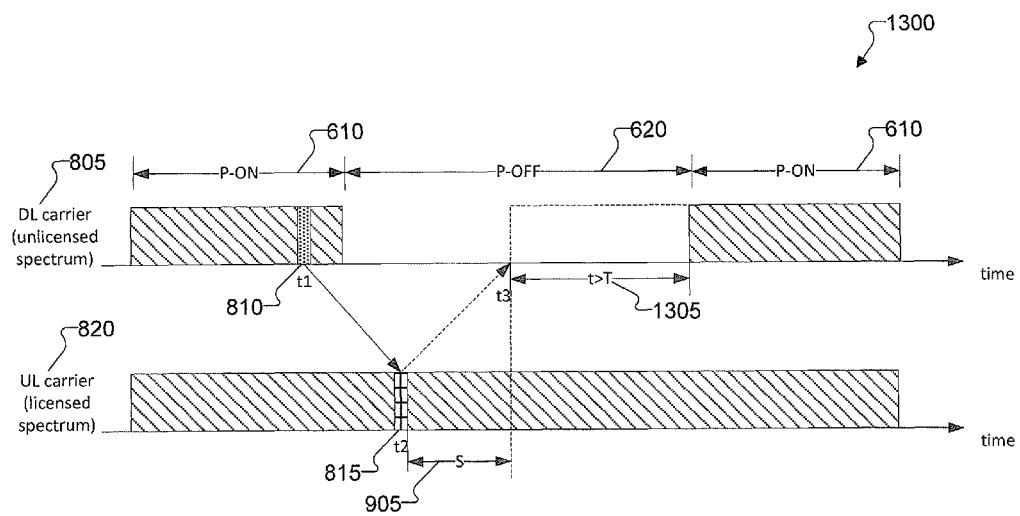

FIG. 13 illustrates another example of a second approach for a DL HARQ process according to this disclosure. The embodiment of the second approach 1300 for the DL HARQ process shown in FIG. 13 is for illustration only. Other embodiments could be used without departing from the scope of the present disclosure.

In an alternative of the second approach, the HARQ process for the transport block is suspended for a period of time, denoted as T 1305, after which if retransmission has not occurred or has not been received by the UE 116, for example, because the LTE-U/LAA carrier is still OFF 615, the UE 116 considers the HARQ process terminated, that is, the UE 116 flushes the DL HARQ buffer or the UE 116 considers the next received transport block on the DL carrier when the P-ON 610 period returns to be a new transport block. An advantage of this alternative is that the UE buffer space used to store the soft data can be recovered. For example, as is illustrated in FIG. 13, the UE 116 begins to wait for retransmission from the eNB 102 S ms 905, such as S=0, 1, 2, 3 or 4, after sending NACK 815 for a transport block 810, which has not been successfully decoded. If the LTE-U/LAA DL carrier 805 remains in P-OFF 620 for more than a T 1305 period after t3, such as t>T, the UE 116 considers the HARQ process terminated; otherwise the UE 116 considers the HARQ process is suspended until t=T or the LTE-U/LAA DL carrier 805 transitions to the P-ON 610 period.

In a third approach, if the LTE-U/LAA DL 810 stops transmissions or going into OFF 615 or dormant state while the UE 116 is waiting for retransmission of a transport block, the HARQ process for the transport block can continue on a second DL carrier, such as another serving cell or the PCell. In other words, the retransmission of the transport block occurs on the second DL carrier. In this way, LTE-U/LAA performance loss can be mitigated and long transport block delivery latency can also be avoided.

Figure 14:
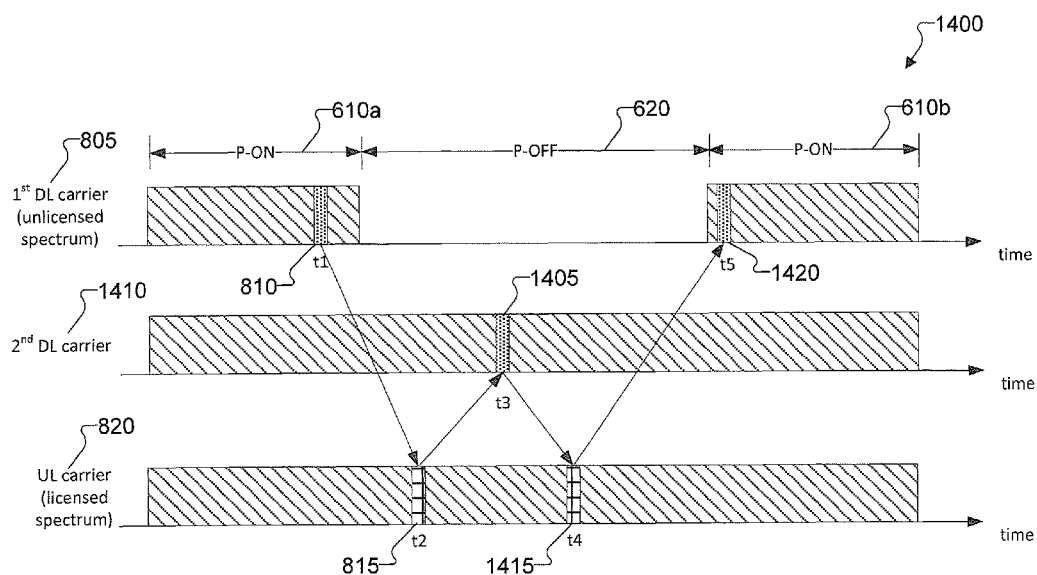
FIGS. 14 and 15 illustrate examples of a third approach for a DL HARQ process according to this disclosure.

FIG. 14 illustrates an example of a third approach for a DL HARQ process according to this disclosure. The embodiment of the third approach 1400 for the DL HARQ process shown in FIG. 14 is for illustration only. Other embodiments could be used without departing from the scope of the present disclosure.

In a first alternative of the third approach, after the LTE-U/LAA carrier has become ON 605 again, the transport block can be retransmitted on the LTE-U/LAA carrier if the transport block retransmission was not successful in the second DL carrier. After receiving the transport block 810 at t1 on the LTE-U/LAA DL carrier 805 in a first P-ON 610*a* and failing to decode the transport block, the UE 116 sends a NACK 815 at t2. Meanwhile the LTE-U/LAA DL carrier 805 is turned OFF 615 in P-OFF 620. The transport block 1405 is then retransmitted on a second DL carrier 1410 at t3. In case the UE 116 is still unable to decode the transport block after soft combining, the UE 116 sends a NACK 1415 at t4 and the LTE-U/LAA DL carrier becomes ON 605 in P-ON 620*b*, the retransmission of the transport block 1420 can resume on the LTE-U/LAA DL carrier 805 at t5. In certain embodiments, the principle described here can also be applied to the case where the second DL carrier 1410 and the UL carrier 820 belong to the same TDD carrier. In certain embodiments, the first DL carrier 810 is a TDD or a FDD carrier with DL carrier component only.

Figure 15:
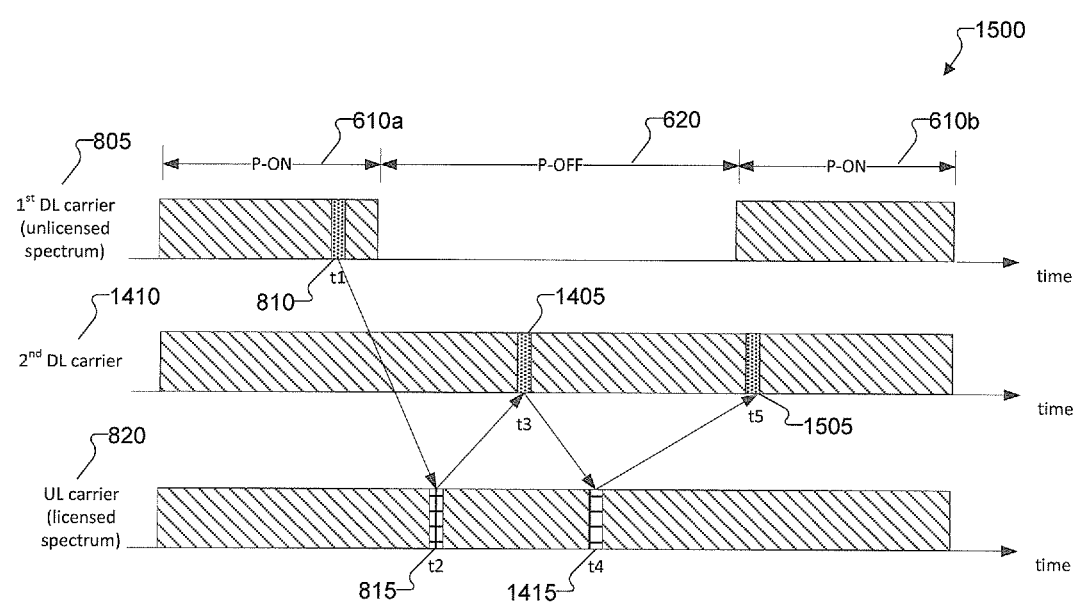

FIG. 15 illustrates another example of a third approach for a DL HARQ process according to this disclosure. The embodiment of the third approach 1500 for the DL HARQ process shown in FIG. 15 is for illustration only. Other embodiments could be used without departing from the scope of the present disclosure.

In a second alternative of the third approach, the transport block can continue to be retransmitted on the second DL carrier 1410 even when the LTE-U/LAA carrier 805 has become ON again, such as in the second P-ON 610*b*. For example, after receiving the transport block 810 at t1 on the LTE-U/LAA DL carrier 805 during a first P-ON 610*a* and failing to decode the transport block, the UE 116 sends a NACK 815 at t2. Meanwhile the LTE-U/LAA DL carrier 805 is turned OFF during P-OFF 620. The transport block 1405 is then retransmitted on a second DL carrier 1410 at t3. In case the UE is still unable to decode the transport block after soft combining, the UE 116 sends a NACK 1415 at t4 and the LTE-U/LAA DL carrier 805 becomes ON again during the second P-ON 610*b*, the retransmission of the transport block 1505 still continues on resume on the second DL carrier 1410.

In a third alternative of the third approach, the first or the second alternative is applied depending upon a predefined condition. That is, whether to continue the on-going retransmission on the second carrier 1410 or to switch back to the LTE-U/LAA carrier 805 depends on a predefined condition. In one example, the condition can be the first available DL sub-frame that can be used to carry the retransmission according to a predefined HARQ timeline. If the first available DL sub-frame is on the LTE-U/LAA carrier 805, for example, because the second carrier is encountering UL sub-frames or DL sub-frame not belonging to the timeline of HARQ process, then the first alternative is applied; else if the first available DL sub-frame is on the second carrier 1410, then the second alternative is applied. The advantage of the third alternative is reduction of retransmission latency.

In a fourth alternative of the third approach, a retransmission of a transport block always occurs on the second carrier 1410 or a configured component carrier, regardless of the ON/OFF status of the LTE-U/LAA carrier 805. The advantage of the fourth alternative is simplicity of the HARQ procedure.

Figure 16:
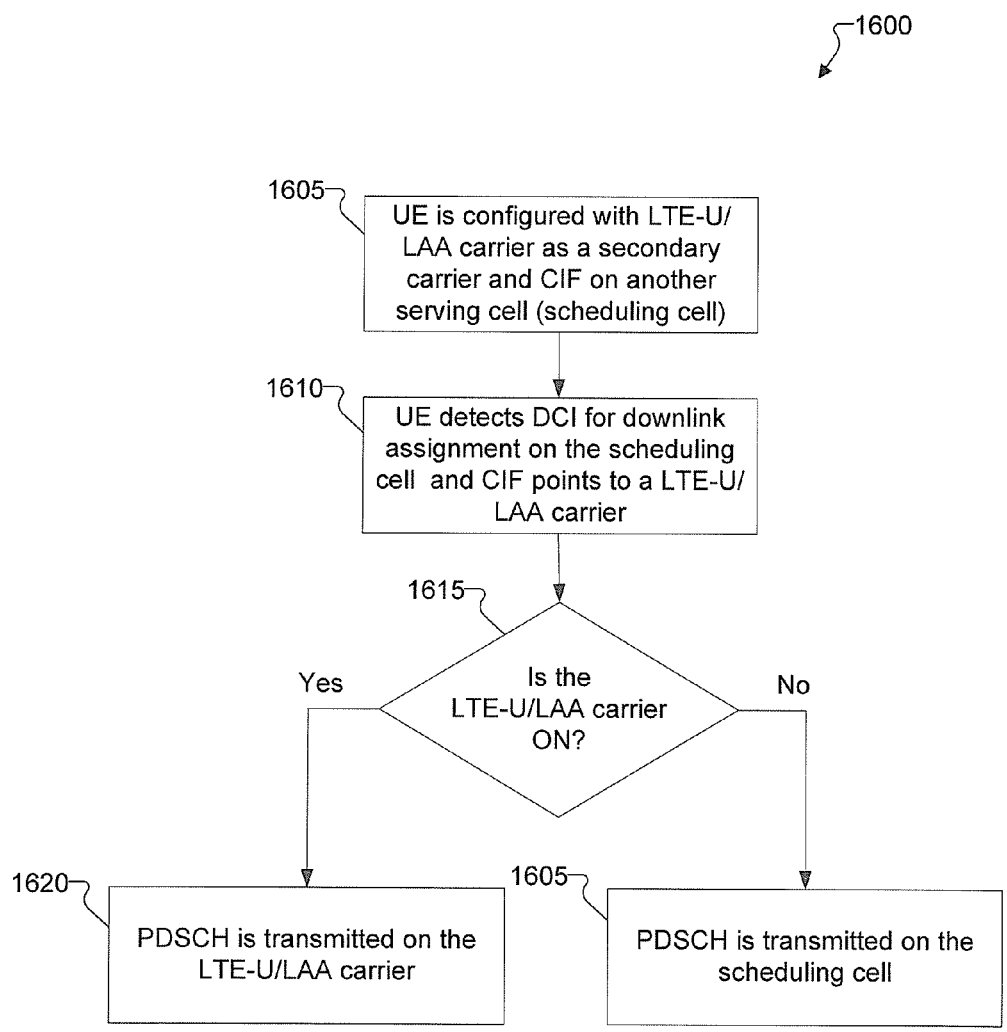
FIG. 16 illustrates a user equipment (UE) procedure for determining the target carrier of scheduled Physical Downlink Shared Channel (PDSCH) according to this disclosure.

FIG. 16 illustrates a user equipment (UE) procedure for determining the target carrier of scheduled Physical Downlink Shared Channel (PDSCH) according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry or a transmitter chain in, for example, a UE.

Embodiments of the present disclosure also provide a control signaling method to enable the third approach. In a first method, when cross carrier scheduling is configured or Carrier Indicator Field is configured for the DCI received by the UE 116 on the second DL carrier, the DCI scheduling downlink assignment for the LTE-U/LAA carrier 805, such as PDCCH/EPDCCH format 2, 2A, 2B, 2C, 2D, with CRC scrambled by C-RNTI, is transmitted on the second DL carrier. The target carrier for the DL assignment is indicated by the Carrier Indicator Field (CIF), such as for a 3-bit CIF, '000' can indicate the second cell, for example, PCell, and '001' can indicate the LTE-U/LAA cell. When the LTE-U/LAA carrier is ON 605, and the CIF of a downlink assignment DCI points to the LTE-U/LAA carrier, the corresponding PDSCH which belongs to a HARQ process on the LTE-U/LAA carrier is transmitted on the LTE-U/LAA carrier. When the LTE-U/LAA carrier is OFF 615, and the CIF of a downlink assignment DCI points to a LTE-U/LAA carrier, the corresponding PDSCH that belongs to a HARQ process on the LTE-U/LAA carrier is transmitted on the second DL carrier 1410; further restriction can be imposed such that the PDSCH on the second DL carrier 1410 carrying the data from the HARQ process of the LTE-U/LAA carrier can only be a retransmission. The HARQ process associated with the retransmission is indicated by the HARQ process number in the DCI. The UE 116 can determine the ON/OFF status of the LTE-U/LAA cell from a signaling by the eNB 102, such as via RRC, MAC or L1 signaling. The signaling can be UE-common or UE-specific. The ON/OFF signaling can also be included in the DCI for DL assignment; for example one bit in the DCI can be used to indicate the ON/OFF status on the LTE-U/LAA carrier that is pointed by the CIF. The one-bit ON/OFF indicator in the DCI can be a part of the 3-bit CIF, hence the number of carriers that can be addressed by the CIF is four carriers. The one-bit ON/OFF indicator can also be a new bit in the DCI, thereby increasing the DCI format size by one bit. The UE 116 can assume that the DCI format size is larger if the one of the carriers configured is an LTE-U/LAA carrier and if CIF is configured.

The UE is first configured with a LTE-U/LAA carrier as a serving cell and CIF is configured for a second serving cell in 1605. The second serving cell is used for transmitting the DCI for scheduling PDSCH on the second serving cell as well as the LTE-U/LAA cell. In block 1610, the UE 116 detects downlink control information (DCI) for downlink assignment on the scheduling cell, the second serving cell, and with a CIF that points to the LTE-U/LAA cell. In block 1615, in response to the CIF received in block 1610, the UE 116 determines whether the LTE-U/LAA cell is ON. When the LTE-U/LAA cell is ON or if PDSCH on LTE-U/LAA cell is assumed present by the UE 116, the PDSCH scheduled by the DCI is received by the UE 116 on the LTE-U/LAA carrier in block 1620. When the LTE-U/LAA cell is OFF or if PDSCH on LTE-U/LAA cell is not assumed present by the UE 116, the PDSCH is received on the second serving cell in block 1625.

In case cross carrier scheduling is not configured, the DCI scheduling of the PDSCH on the LTE-U/LAA cell can also be transmitted on the LTE-U/LAA cell. To enable the third approach, the DCI scheduling retransmission is transmitted on the second serving cell, where CIF can be present to indicate the target carrier of the current HARQ process. CIF can be present in the DCI on the second serving cell only when the LTE-U/LAA carrier is OFF. Alternatively, the CIF is always configured for the second serving cell regardless of the ON/OFF state of LTE-U/LAA carrier; however the CIF may only point to the LTE-U/LAA carrier for retransmission of TB that was initially transmitted on the LTE-U/LAA carrier.

Figure 17:
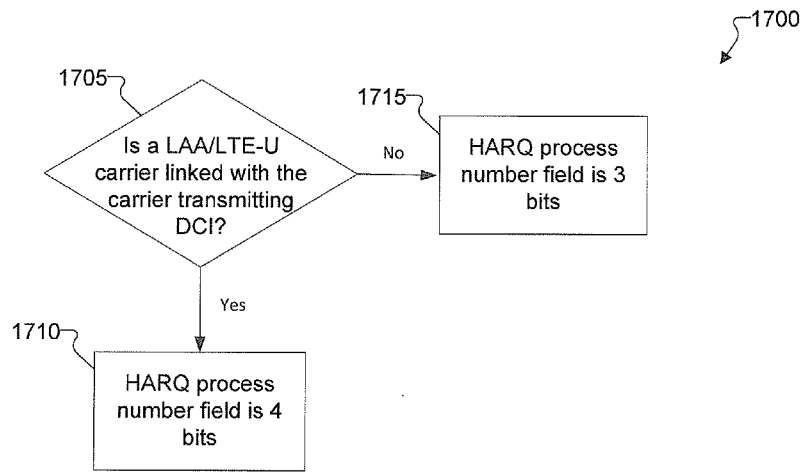
FIG. 17 illustrates a procedure to determine the number of bits for HARQ process number field (FDD) according to this disclosure.

FIG. 17 illustrates a procedure to determine the number of bits for HARQ process number field (FDD) according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry or a transmitter chain in, for example, a UE.

An alternative method to signaling by CIF is signaling by HARQ process number. The HARQ process numbers for the HARQ processes on the LTE-U/LAA carrier that is scheduled on the second serving cell can be assigned to be X1, X1+1, X1+2, ..., X1+X2, where X1 is the total number of HARQ processes on the second serving cell and X2 is the total number of HARQ processes on the LTE-U/LAA carrier. If the extended HARQ process number signaled in the DCI on the second serving cell is any number of 0 to X1-1, the scheduled PDSCH is for the HARQ process of the second serving cell. If the extended HARQ process number signaled in the DCI on the second serving cell is a number Y from X1 to X1+X2, the scheduled PDSCH, transmitted on the second serving cell, is for the HARQ process, of HARQ process number Y-X1, of the LTE-U/LAA carrier. The number of bits for extended HARQ process number field is $ceil(log_2(X1+X2))$, where ceil is the ceiling operator, to indicate a total of X1+X2 HARQ processes, such as for X1=X2=8, the HARQ process number field is 4 bits. Accordingly, in block 1605, the UE 116 determines whether an LAA/LTE-U carrier is linked with the carrier transmitting DCI. When the LAA/LTE-U carrier is linked with the carrier transmitting DCI, the HARQ process number field is four bits in block 1610. When the LAA/LTE-U carrier is not linked with the carrier transmitting DCI, the HARQ process number field is three bits in block 1615.

In another example, the number of HARQ processes for the second serving cell and the LAA/LTE-U carrier is reduced such that the number of bits for HARQ process number field is the same as LTE Rel-12, such as three (3) bits for Frequency Division Duplex (FDD) and four (4) bits for Time Division Duplex (TDD), for example, for FDD, there can be a total of six and two HARQ processes for the second serving cell and the LAA/LTE-U carrier, respectively. To allow for network flexibility, the number of HARQ processes for each carrier addressable by the HARQ process number field can be configurable by the network. For this method of indication by (extended) HARQ process number, it is beneficial to restrict the number of carriers that can be addressed by the (extended) HARQ process number field. For example, there may be only two carriers that can be addressed by the (extended) HARQ process number field, implying also that cross-carrier HARQ retransmission can only happen between the two carriers although the UE may be configured with more than two carriers.

For the third approach, transport blocks belonging to HARQ processes of different carriers can be transmitted in the same sub-frame of the same carrier, for example, on different set of physical resource blocks. In certain embodiments, when the UE 116 is not capable of receiving multiple transport blocks belonging to different HARQ processes in the same sub-frame, a dropping rule is defined such that a transport block is discarded by the UE 116. For example, the rule can be that the transport block belonging to the HARQ process on the LTE-U/LAA cell is discarded. Another example of the rule can be that the transport block with fewer numbers of retransmissions is dropped.

In certain embodiments, further restriction can be imposed on the carrier that is configured to retransmit a transport block that was initially transmitted on a LAA/LTE-U carrier, such that the carrier should also be a LAA/LTE-U carrier. This minimizes the impact of operation on component carriers that are not LAA/LTE-U carriers.

Although the methods are described for transmission and retransmission of DL transport block on LTE-U/LAA cell, the methods can also be applied for transmission and retransmission of UL transport block on LTE-U/LAA cell. For example, retransmission of UL transport block on a carrier different than the initial carrier can be used as a means to maintain synchronous HARQ operation for UL.

In One Embodiment (Embodiment 2—LTE-U/LAA CA Architecture and HARQ Entity)

In LTE Rel-12, there is one HARQ entity at the MAC entity for each serving cell which maintains a number of parallel HARQ processes. Each HARQ process is associated with a HARQ process identifier. The HARQ entity directs HARQ information and associated TBs received on the DL-SCH to the corresponding HARQ processes.

To facilitate cross-carrier HARQ operation, embodiments of the present disclosure enhance the function of HARQ entity.

Figure 18:
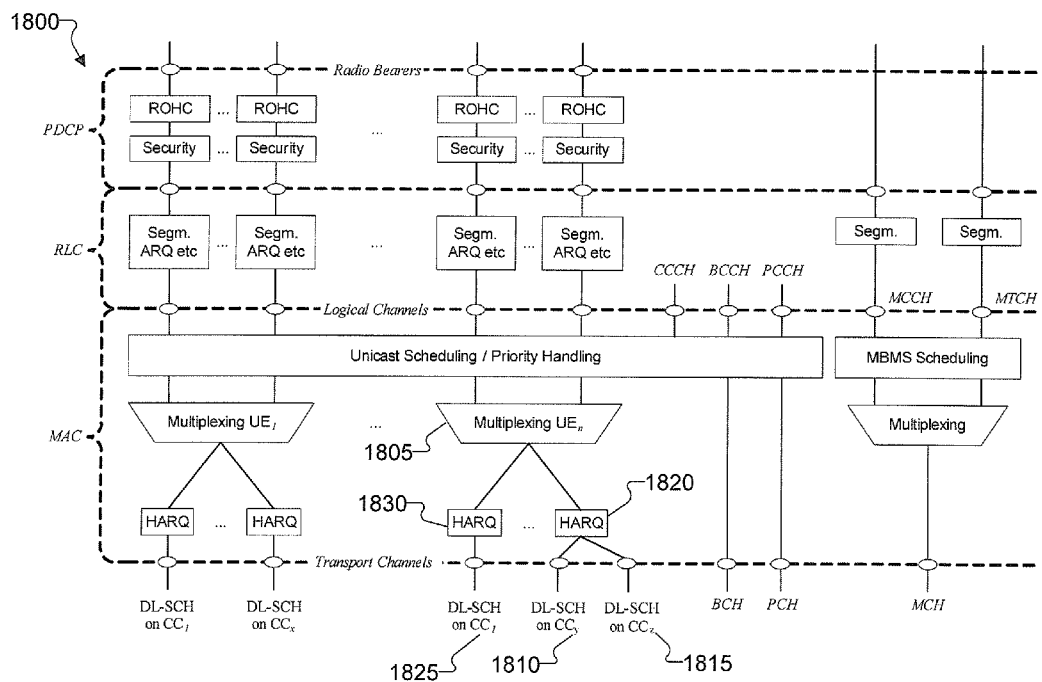
FIGS. 18 and 19 illustrate layer 2 CA architectures at the evolved NodeB (eNB) according to this disclosure.
Figure 19:
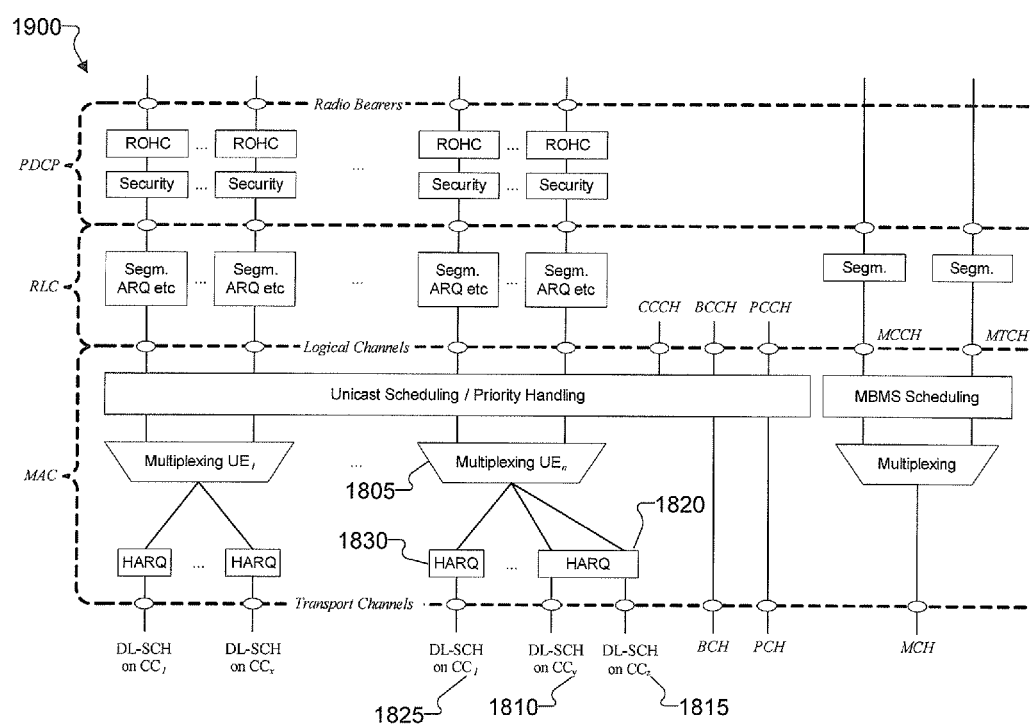

FIGS. 18 and 19 illustrate layer 2 CA architectures at the evolved NodeB (eNB) according to this disclosure. The layer 2 structure for downlink (DL) with Carrier Aggregation (CA) is configured where one or more LAA/LTE-U carrier is configured for UE n. The embodiments of the layer 2 structure 1800 shown in FIG. 18 and the layer 2 structure 1900 shown in FIG. 19 are for illustration only. Other embodiments could be used without departing from the scope of the present disclosure.

In a first method, the HARQ processes of multiple serving cells, where at least one of the serving cell can be a LAA/LTE-U cell, can be maintained by one HARQ entity. The HARQ entity can direct HARQ information and associated TBs received on the DL-SCH of multiple serving cells to the corresponding HARQ processes. Each HARQ process of each carrier can be associated with an extended HARQ process identifier or can be associated with a HARQ process identifier along with a carrier indicator (both approaches described in Embodiment 1).

In the examples shown in FIGS. 18 and 19, one or multiple LTE-U/LAA carrier is configured to $UE_n$ 1805. Either $CC_y$ 1810 or $CC_z$ 1815, or both $CC_y$, 1810 or $CC_z$ 1815 can be LTE-U or LAA carrier. The HARQ processes of $CC_y$ 1810 and $CC_z$ 1815 are maintained by the same HARQ entity 1820; hence cross-carrier HARQ retransmission can be applied among $CC_y$, 1810 and $CC_z$ 1815. $CC_1$ 1825 is also configured to UE n 1805 but its HARQ processes is maintained by a separate HARQ entity 1830. Therefore, cross-carrier HARQ retransmission cannot be applied to $CC_1$ 1825. The set of serving cells or component carriers that are associated with the same HARQ entity can be configured by higher level signaling, such as RRC configuration.

Figure 20:
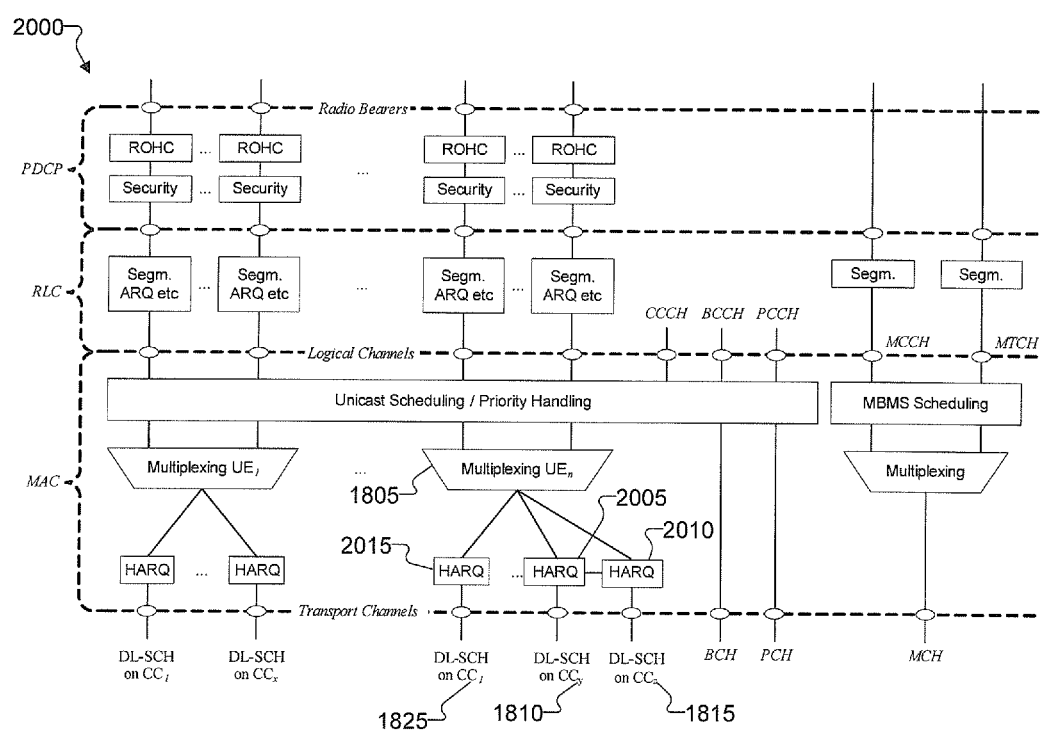
FIG. 20 illustrates another layer 2 CA architecture at the eNB according to this disclosure.

FIG. 20 illustrates another layer 2 CA architecture at the eNB according to this disclosure. The layer 2 structure for downlink (DL) with Carrier Aggregation (CA) is configured where one or more LAA/LTE-U carrier is configured for UE n. The embodiment of the layer 2 structure 2000 shown in FIG. 20 is for illustration only. Other embodiments could be used without departing from the scope of the present disclosure In a second method, there is still one HARQ entity at the MAC entity for each LAA/LTE-U serving cell which maintains a number of parallel HARQ processes. If the TB(s) received on the DL-SCH of a serving cell with a first HARQ entity belong to a HARQ process of another serving cell with a different (second) HARQ entity, the first HARQ entity can direct the corresponding HARQ information and associated TB(s) to the second HARQ entity. The methods to identify which serving cell or which HARQ entity the TB(s) belong to can be as described in Embodiment 1.

In the example shown in FIG. 20, one or multiple LTE-U/LAA carrier is configured to $UE_n$ 1805. Either $CC_y$ 1810 or $CC_z$ 1815, or both $CC_y$ 1810 or $CC_z$ 1815 can be LTE-U or LAA carrier. The HARQ processes of $CC_y$ 1810 and $CC_z$ 1815 are maintained by HARQ entity 2005 and HARQ entity 2010, respectively. At the eNB 102, if the TB(s) belong to a HARQ process of $CC_z$ 1815 is scheduled on the DL-SCH of $CC_y$ 1810, the HARQ entity 2010 can direct the corresponding HARQ information and associated TB(s) to HARQ entity 2005. At the UE 116, when the TB(s) received on the DL-SCH of $CC_y$ 1810 belong to a HARQ process of $CC_z$ 1815, the HARQ entity for $CC_y$ 1810 can direct the corresponding HARQ information and associated TB(s) to HARQ entity for $CC_z$ 1815; hence cross-carrier HARQ retransmission for TB(s) initially transmitted on $CC_z$ 1815 can occur on $CC_y$ 1810. $CC_1$ 1825 is also configured to $UE_n$ 1805 but its HARQ processes is maintained by a separate HARQ entity 2015. Therefore, cross-carrier HARQ retransmission cannot be applied to $CC_1$ 1825. The set of serving cells or component carriers that are associated with the same HARQ entity can be configured by higher level signaling, such as RRC configuration.

In LTE Rel-12, there is also one HARQ entity at the MAC entity for each serving cell with configured uplink, which maintains a number of parallel HARQ processes allowing transmissions to take place continuously while waiting for the HARQ feedback on the successful or unsuccessful reception of previous transmissions. When the physical layer is configured for uplink spatial multiplexing, there are two HARQ processes associated with a given TTI. Otherwise there is one HARQ process associated with a given TTI. At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).

To facilitate cross-carrier HARQ operation for UL, the first and the second method can also be applied to UL CA where one or more LAA/LTE-U carrier is configured as UL carrier.

Figure 21:
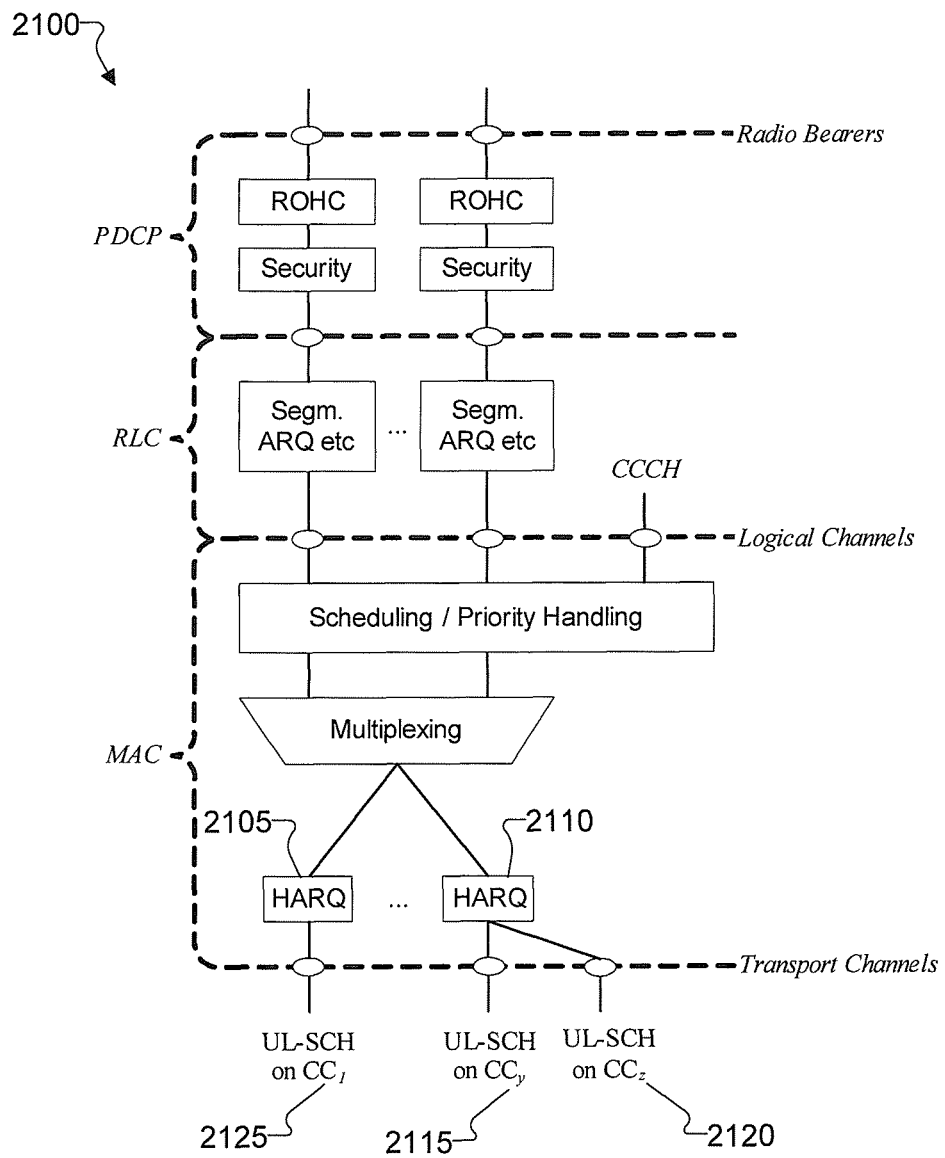
FIG. 21 illustrates an example of Layer 2 CA architecture at the UE according to the first method according to this disclosure.

FIG. 21 illustrates an example of Layer 2 CA architecture at the UE according to the first method according to this disclosure. The embodiment of the Layer 2 CA architecture 2100 shown in FIG. 21 is for illustration only. Other embodiments could be used without departing from the scope of the present disclosure.

The HARQ entity 2105, 2110 identifies the HARQ process(es) from the associated component carriers, $CC_y$ 2115 or $CC_z$ 2120 or $CC_1$ 2125, for which a transmission should take place. For example, a first HARQ entity 2105 is associated with a first, separate component carrier (CC), $CC_1$ 2125; and a second HARQ entity 2110 is associated with component carriers, $CC_y$ 2115 an $CC_z$ 2120. The HARQ entity 2105, 2110 also routes the received HARQ feedback (ACK/NACK information), MCS and resource, relayed by the physical layer, to the appropriate HARQ process(es). Each HARQ process of each carrier can be associated with an extended HARQ process identifier or can be associated with a HARQ process identifier along with a carrier indicator, for example, both approaches described in Embodiment 1.

Figure 22:
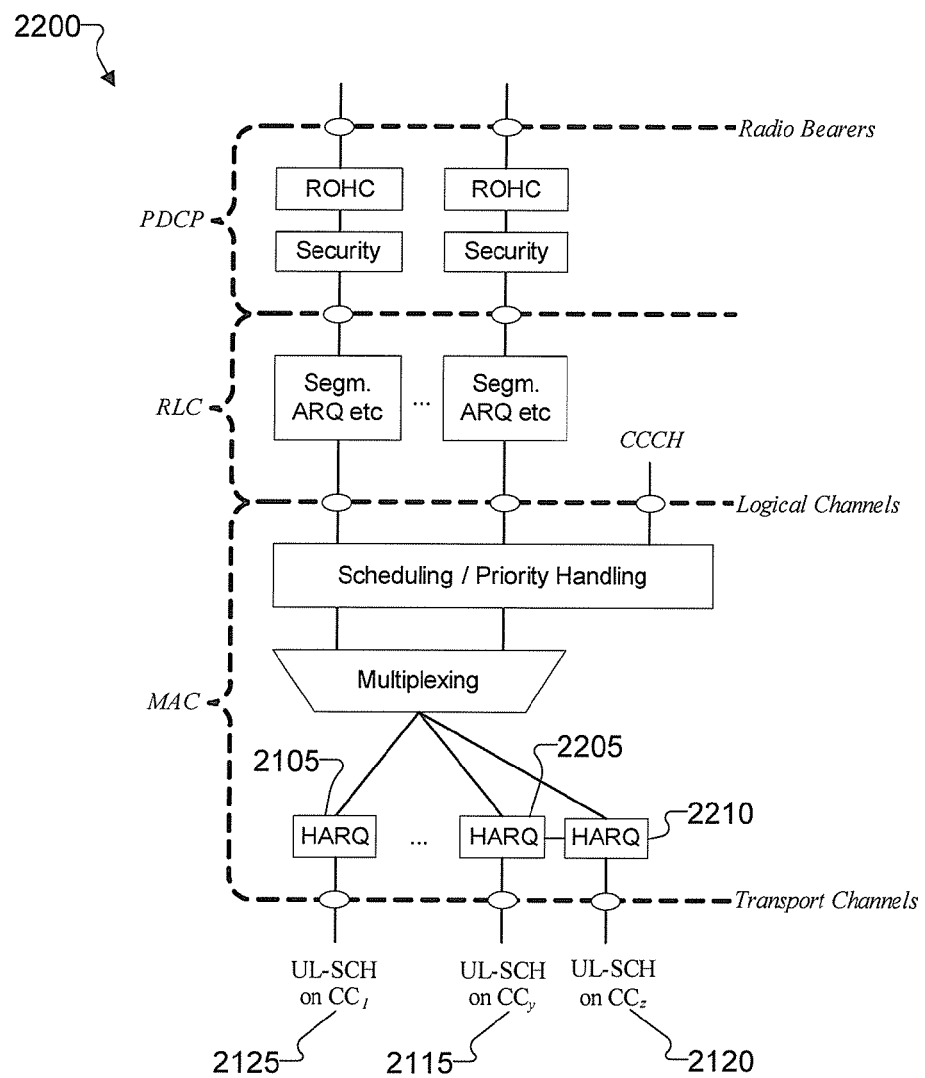
FIG. 22 illustrates an example of Layer 2 CA architecture at the UE according to the second method according to this disclosure.

FIG. 22 illustrates an example of Layer 2 CA architecture at the UE according to the second method according to this disclosure. The embodiment of the Layer 2 CA architecture 2200 shown in FIG. 22 is for illustration only. Other embodiments could be used without departing from the scope of the present disclosure.

The HARQ entity 2105, 2205, 2210 identifies the HARQ process(es) and the component carrier, $CC_y$ 2115 or $CC_z$ 2120 or $CC_1$ 2125, for which a transmission should take place. For example, a first HARQ entity 2105 is associated with a first, separate component carrier, $CC_1$ 2125; a second HARQ entity 2205 is associated with component carrier, $CC_y$ 2115; and a third HARQ entity 2210 is associated with component carrier, $CC_z$ 2120. The respective HARQ entity 2105, 2205, 2210 also routes the received HARQ feedback (ACK/NACK information), MCS and resource, relayed by the physical layer, to the appropriate HARQ entity. The methods to identify which serving cell or which HARQ entity 2105, 2205, 2210 to which the transmission belongs can be as described in Embodiment 1.

In One Embodiment (Embodiment 3—LTE-U/LAA Frame with DL Sub-Frames and UL Sub-Frames for UCI)

Figure 23:
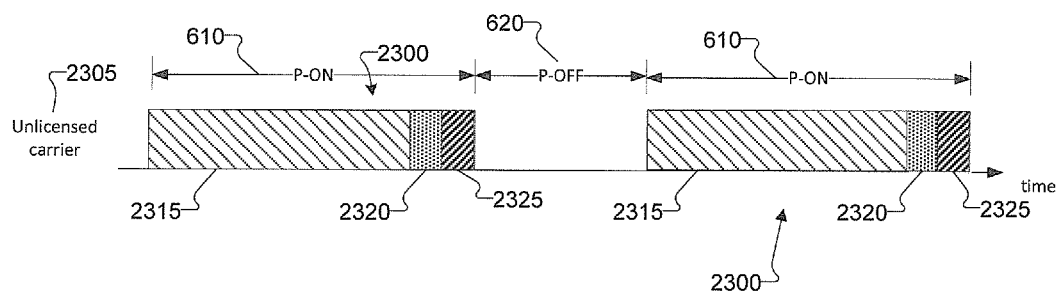
FIG. 23 illustrates an example of LTE-U/LAA frame according to this disclosure.

FIG. 23 illustrates an example of LTE-U/LAA frame according to this disclosure. The embodiment of the LTE-U/LAA frame 2300 shown in FIG. 23 is for illustration only. Other embodiments could be used without departing from the scope of the present disclosure.

A LTE-U/LAA frame includes a set of DL sub-frames, followed by a special sub-frame and an UL sub-frame. The number of DL sub-frames can be either predefined or can be configured by the network. Possible numbers of DL sub-frames include one, two, three, four, five, six, seven, and eight sub-frames. In the example shown in FIG. 23, the LTE-U/LAA frame 2300 structure is on an unlicensed carrier 2305. The LTE-U/LAA frame 2300 in P-ON 610 begins with a set of DL sub-frames 2315, which is then followed by a special sub-frame 2320, which is a 1 ms sub-frame comprising Downlink Pilot Time Slot (DwPTS), guard period (GP) and Uplink Pilot Time Slot (UpPTS) and an UL sub-frame 2325, which is 1 ms. The start time of a LTE-U/LAA frame 2310 can be signaled by the network from another serving cell with UE-common signaling (single signaling for all or a group of UEs) or UE-specific signaling (single signaling for single UE), such as using dynamic (L1) control channel (for example, (E)PDCCH), MAC CE, or RRC signaling. The duration of a LTE-U/LAA frame, or equivalently the number of DL sub-frames if the number of special sub-frame and UL sub-frame is fixed, can be fixed, for example, 5 ms, 10 ms, and so forth, or can also be signaled by the network from another serving cell, with UE-common or UE-specific signaling using dynamic (L1)

control channel (for example, (E)PDCCH), MAC CE or RRC signaling, or the duration can also be signaled from the LTE-U/LAA carrier, such as, using a UE-common or a UE-specific dynamic (L1) control channel (for example, (E)PDCCH), in the first DL sub-frame of the LTE-U/LAA frame. For example, the CRC of the UE common (E)PDCCH can be scrambled with an RNTI value commonly configured or known to all UEs, including a new common RNTI. The CRC of the UE specific (E)PDCCH can be scrambled with an RNTI value uniquely configured to a UE, for example, C-RNTI.

The sub-frames of LTE-U/LAA frame can be indexed by assigning sub-frame index 0 to the first sub-frame of the LTE-U/LAA frame followed by sub-frame index 1 to the second sub-frame of the LTE-U/LAA frame, and so on. In certain embodiments, the LTE-U/LAA sub-frame index is not necessarily aligned with the sub-frame index of another serving cell for a given time.

In certain embodiments, the first sub-frame of a LTE-U/LAA frame can always be sub-frame #0 regardless of the length of the idle, P-OFF 620, period. This enables utilization of an available channel immediately when the channel becomes available. In another option, sub-frame #0 can only occur at 10 ms periodicity or at an integer multiple of 10 ms periodicity. Assuming the first sub-frame of a LTE-U/LAA frame 2310 is always sub-frame #0, may cause some latency in utilizing an available channel, but keeping sub-frame index alignment between the LTE-U/LAA carrier and the other serving carrier can simplify carrier aggregation operation. In another option, the first sub-frame of a LTE-U/LAA frame is the same as the sub-frame index of the other serving cell such as the PCell at the time; for example if the first LTE-U/LAA sub-frame arrives at the time at which the sub-frame at the other serving cell is sub-frame #i, (i=0,1, . . . 9), the first LTE-U/LAA sub-frame index is also sub-frame #i. Another example of sub-frame indexing is to reuse the frame structure of TDD uplink-downlink configuration 5, where the LTE-U/LAA frame begins with sub-frame #3, that is, the sub-frame indexing is 3, 4, 5, 6, 7, 8, 9, 0, 1, 2.

Hereafter, in this embodiment, it is assumed the first sub-frame of a LTE-U/LAA frame begins with sub-frame #0. The principles described hereafter can also be applied to other sub-frame indexing conventions.

The physical signals that can be present in each sub-frame of a 10 ms LTE-U/LAA frame can include one or more of the following:

DL sub-frame #0, #5: SSS, CRS, DM-RS, CSI-RS, (E)PDCCH, PDSCH, PRS;
DL sub-frame #1, #6: PSS, CRS, DM-RS, CSI-RS, (E)PDCCH, PDSCH, PRS;
DL sub-frame#2-#4, #7: CRS, CSI-RS, (E)PDCCH, PDSCH, PRS;
Special sub-frame #8: DwPTS (CRS, DM-RS, (E)PDCCH, PDSCH), UpPTS (SRS); and
UL sub-frame #9: SRS, PUCCH, PUSCH CSI-RS includes non-zero powered and zero-powered CSI-RS. (E)PDCCH and PDSCH for unicast data are only present if scheduled by the network and need not be present in every DL sub-frame. CSI-RS and PRS also need not be present in every DL sub-frame. The location of CSI-RS can be configured by the network.

The physical signals transmitted on the LTE-U/LAA carrier can have resource elements mapping according to that of LTE. The PSS and the SSS can be mapped according to the LTE frame structure type 2 (TDD). In one alternative, the PSS and the SSS can be mapped in the same sub-frame (DL sub-frame #0 and DL sub-frame #5) according to the LTE frame structure type 1 (FDD).

More generally, depending upon the duration of the LTE-U/LAA frame 2310, the start and end of DL sub-frames and the sub-frame index for the special sub-frame 2320 and UL sub-frame 2325 can be changed accordingly. For example, if the duration of the LTE-U/LAA frame 2310 is N, then sub-frame #0 to #N−3 are the DL sub-frames, sub-frame #N−2 is the special sub-frame and sub-frame #N−1 is the UL sub-frame. If sub-frame #5 is an UL sub-frame, then the PSS and the SSS are not mapped on sub-frame #5 and there may be only one PSS and one SSS in a LTE-U/LAA frame 2310. If the first sub-frame of a LTE-U/LAA frame 2310 is always sub-frame #0 and is always a DL sub-frame, the UE 116 can assume the PSS and the SSS is always transmitted in the first sub-frame (assuming the RE mapping of LTE frame structure type 1(FDD)).

Even when there is no UL data transmission on a LTE-U/LAA carrier, the UL sub-frame of a LTE-U/LAA frame can be used to carry Uplink Control Information (UCI), namely HARQ-ACK for DL assignment (unicast PDSCH) and Channel State Information (CSI) that can be measured using CRS or CSI-RS on the LTE-U/LAA carrier 2305. An advantage of providing an UL sub-frame to carry UCI for the LTE-U/LAA carrier is that PUCCH overhead on the other serving cell or carrier can be reduced. In another example, the UL sub-frame of a LTE-U/LAA frame is used to carry CSI on PUCCH (or PUSCH) but HARQ-ACK is transmitted on another serving cell. An advantage of this approach is that PUCCH overhead on the other serving cell can still be reduced by not having to support CSI feedback for the LTE-U/LAA carrier, which often has larger overhead compared to HARQ-ACK, and HARQ-ACK can be delivered on the other serving cell, which can be more reliable and a conventional timeline for HARQ-ACK feedback can be followed as there is no P-OFF 620 period on the other serving cell. If the UL sub-frame is only used to deliver UCI, the UL resource can be under-utilized. In this case, more than one UL sub-frame symbols can be used for SRS transmissions from UEs served by the LTE-U cell. As it is possible that the UE 116 cannot simultaneously transmit SRS and PUCCH, SRS transmissions in an UL sub-frame can be from UEs that are not configured respective CSI transmissions in the UL sub-frame and SRS transmissions can be restricted in an UL bandwidth that excludes the bandwidth of PUCCH transmissions. It is also possible for a UE 116 to support SRS transmission and PUCCH transmission in a same UL sub-frame by transmitting the SRS in the last symbol of the UL sub-frame while puncturing the PUCCH transmission in the last symbol of the UL sub-frame.

Ideally, the UL sub-frame can be used to deliver HARQ-ACK for all transport blocks received in all DL sub-frames, including no reception, in the same LTE-U/LAA frame. However, a UE 116 typically requires some time to decode a DL transport block before the UE 116 can determine if ACK or NACK should be sent. For example, in LTE FDD UE 116 transmits HARQ-ACK information in sub-frame n+4 for a DL transport block the UE 116 receives in sub-frame n. Assuming a same decoding time for a DL transport block transmitted on a LTE-U/LAA carrier 2305 and considering, for example, a LTE-U/LAA frame 2310 of 10 ms, UL sub-frame #9 can be used to transmit HARQ-ACK only for the transport blocks received in DL sub-frames #0-#5, such as using a PUCCH format 3.

Figure 24:
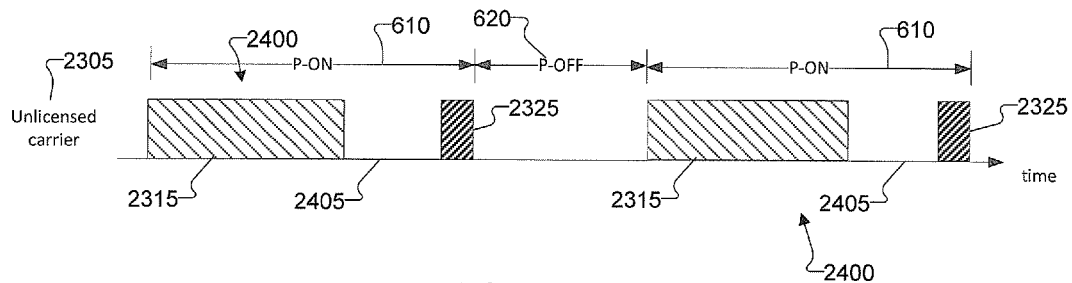
FIG. 24 illustrates an example of LTE-U/LAA frame with some sub-frames are muted according to this disclosure.

FIG. 24 illustrates an example of LTE-U/LAA frame in which some sub-frames are muted according to this disclosure. The embodiment of the LTE-U/LAA frame 2400 shown in FIG. 24 is for illustration only. Other embodiments could be used without departing from the scope of the present disclosure.

In a first option, UE 116 does not provide HARQ-ACK for DL transport blocks that UE 116 receives in sub-frames #6 and #7. In a second option, no unicast PDSCH or transport blocks are expected to be received by UE 116 in sub-frames #6 and #7, that is, sub-frame #6 may only include transmission of PSS, CRS, CSI-RS and PRS and sub-frame #7 may only include transmissions of CRS, CSI-RS and PRS. In a third option, sub-frames #6 and #7 can be completely muted by the network. The special sub-frame #8 can also be muted. The third option is illustrated in the example shown in FIG. 24, the LTE-U/LAA frame 2400 includes DL sub-frames 2315, muted sub-frames 2405 and UL sub-frame 2325. During muted sub-frames 2405, UE 116 is able to perform CCA or LBT procedure on the same carrier or to perform measurements on other carriers.

Figure 25:
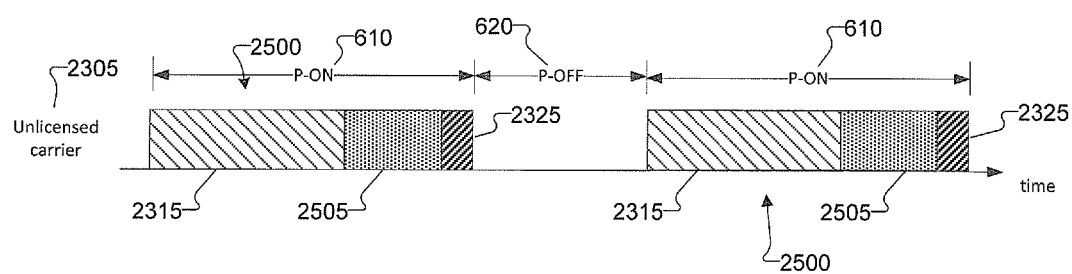
FIG. 25 illustrates an example of LTE-U/LAA frame with extended special sub-frame according to this disclosure.

FIG. 25 illustrates an example of LTE-U/LAA frame with extended special sub-frame according to this disclosure. The embodiment of the LTE-U/LAA frame 2500 shown in FIG. 25 is for illustration only. Other embodiments could be used without departing from the scope of the present disclosure.

In a fourth option, the special sub-frame 2320 can be extended as a special extended sub-frame 2505 to cover multiple sub-frames. In the previous example of 10 ms LTE-U/LAA frame 2500, the special extended sub-frame 2505 covers sub-frames #6, #7 and #8 as illustrated in the example shown in FIG. 25. In a fifth option, as previously mentioned, HARQ-ACK is transmitted on the other serving cells while CSI is transmitted on the cell associated with the LTE-U/LAA carrier.

Figure 26:
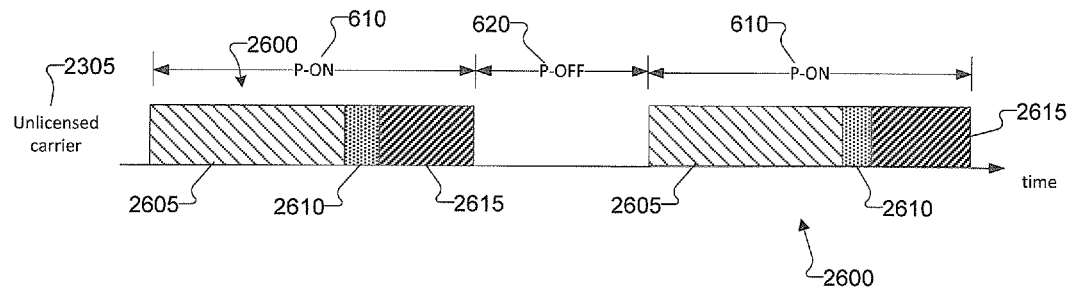
FIG. 26 illustrates an example of LTE-U/LAA frame with multiple UL sub-frames according to this disclosure.

FIG. 26 illustrates an example of LTE-U/LAA frame with multiple UL sub-frames according to this disclosure. The embodiment of the LTE-U/LAA frame 2600 shown in FIG. 26 is for illustration only. Other embodiments could be used without departing from the scope of the present disclosure.

Instead of allocating only one UL sub-frame for UEs to transmit UCI or other UL signaling, multiple UL sub-frames can be used. For example, assuming a 10 ms LTE-U/LAA frame 2600, sub-frames #0 to #5 can be DL sub-frames, sub-frame #6 can be special sub-frame and sub-frames #7 to #9 can be UL sub-frames. The 10 ms LTE-U/LAA frame 2600 includes DL sub-frames 2605 in sub-frames #0 to #5, special sub-frames 2610 in sub-frame #6, and UL sub-frames 2615 in sub-frames #7 to #9.

Figure 27:
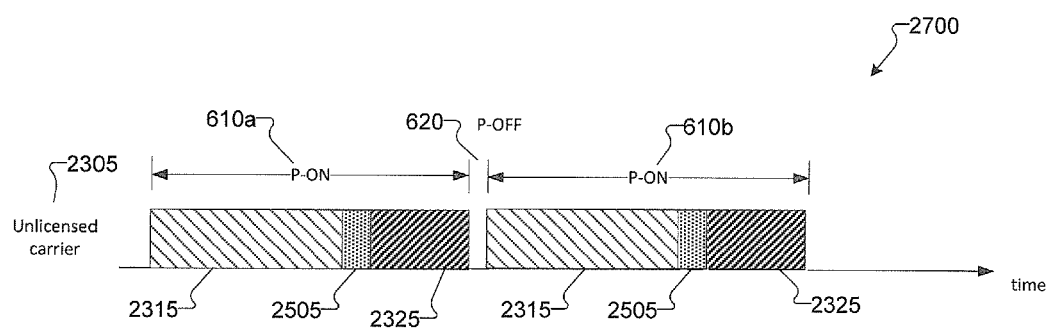
FIG. 27 illustrates an example of minimum idle period (P-OFF) for LTE-U/LAA carrier according to this disclosure.

FIG. 27 illustrates an example of minimum idle period (P-OFF) for LTE-U/LAA carrier according to this disclosure. The embodiment of the LTE-U/LAA frame structure 2700 shown in FIG. 27 is for illustration only. Other embodiments could be used without departing from the scope of the present disclosure.

Transmission of HARQ-ACK corresponding to receptions of DL transport blocks in sub-frames #0 to #5 can be spread over the UL sub-frames. An example is given in TABLE 1. Alternatively, HARQ-ACK for a DL data transport block received in DL sub-frame n can be transmitted in the first UL sub-frame that occurs at least four sub-frames after sub-frame n.

TABLE 1

An example of UL HARQ-ACK timing for LTE-U/LAA

| DL transport blocks (PDSCH) in | UL HARQ-ACK in |
|---|---|
| Sub-frame #0, #1 | Sub-frame #7 |
| Sub-frame #2, #3 | Sub-frame #8 |
| Sub-frame #4, #5 | Sub-frame #9 |

A LTE-U/LAA deployment can have a predetermined or preconfigured P-OFF 620, such as 50 ms, 100 ms, and so forth, and the value P-OFF 620 can change according to the traffic or the interference conditions on the LTE-U/LAA carrier 2305, such as interference that originates from a WiFi AP or STA. If a listen-before-talk (LBT) protocol is applied, there can be an idle period after the end of channel occupancy, namely, end of P-ON, 610, where a minimum idle period of, for example, 5% of the channel occupancy time can be specified, for example, according to European regulation, ETSI EN 301893 V1.7.1. The idle period can include a Clear Channel Assessment (CCA) period towards the end of the idle period, where UE 116 can perform carrier sensing. For a 10 ms P-ON 610, the minimum idle period can be 0.5 ms. Alternatively, the minimum idle period for a LTE-U/LAA carrier 2305 can be 1 ms so that the LTE-U/LAA timing maintains the 1 ms granularity of LTE sub-frames. In another alternative, the minimum idle period for LTE-U carrier 2305 can be 1 ms regardless of the actual P-ON 610 duration. In another alternative, the minimum idle period for LTE-U/LAA carrier 2305 can also include control signaling latency that includes the latency of control signaling preparation and transmission by the network, and control signaling reception and decoding by the UE 116. For example, the minimum idle period of LTE-U/LAA carrier 2305 can be defined as carrier sensing period, such as 0.5 ms, plus the control signaling latency to enable the UE 116 to receive on the LTE-U/LAA carrier 2305. The control signaling latency can be 2 ms, for example, 1 ms for network preparation and transmission of control signaling and 1 ms for the UE 116 to receive and decode the control signaling. Further latency can be included if LTE-U/LAA frame can only begin at specific times, such as every 10 ms or 20 ms or 40 ms. The minimum idle period can be reduced if the UE 116 can buffer the received signals corresponding to a portion or all of the control signaling latency. For example, the UE 116 can buffer the received signals while receiving and decoding the control signaling. An example of the minimum P-OFF 620 or idle period for LTE-U/LAA carrier 2305 is illustrated in FIG. 27. In the example of FIG. 27, a first P-ON 610a terminates and a P-OFF 620 period begins. A second P-ON 610b commences after P-OFF 620 when the channel is sensed to be available by the LTE-U/LAA cell.

Figure 28:
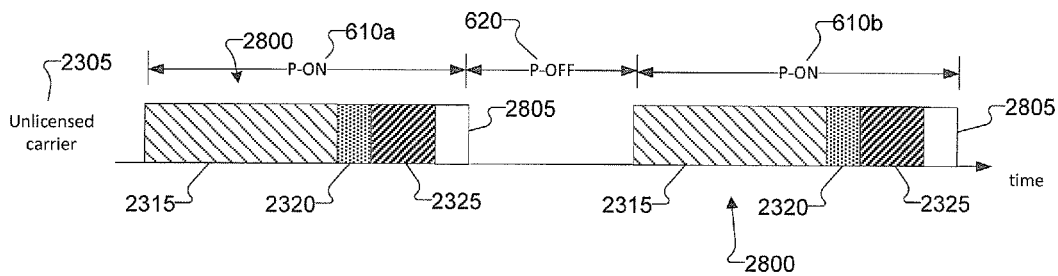
FIG. 28 illustrates a last portion of P-ON period is used for carrier sensing according to this disclosure.

FIG. 28 illustrates a last portion of P-ON period is used for carrier sensing according to this disclosure. The embodiment of the P-ON period 610 shown in FIG. 28 is for illustration only. Other embodiments could be used without departing from the scope of the present disclosure.

In another example, the last sub-frame of the LTE-U/LAA frame 2800 can be a carrier sensing sub-frame 2805 that is used for carrier sensing purpose to meet the LBT requirement. For example, UL sub-frame #9 is muted to enable carrier sensing or, in other words, UL sub-frame #9 is not defined. The LTE-U/LAA sub-frame 2800 includes carrier sensing sub-frame 2805 used for carrier sensing. An example of the corresponding HARQ-ACK timing is given in TABLE 2. In yet another example, only the second slot (0.5 ms) of UL sub-frame #9 is muted for carrier sensing purpose. The first slot of UL sub-frame #9 can still be utilized for UL transmission such as for PUSCH, PUCCH, or SRS transmission. Since only half of the sub-frame is used for UL transmissions, the UL transport block size as indicated by the "modulation and coding scheme and redundancy version" field of UL DCI format can be scaled down by half. HARQ-ACK timing can be as indicated in TABLE 1 or as indicated in TABLE 2 in case using half of a sub-frame to transmit HARQ-ACK cannot meet the minimum HARQ-ACK reception reliability performance requirement. If the LTE-U/LAA frame consists of only DL sub-frames, similar to the principles described above, the last sub-frame, the carrier sensing sub-frame 2805, can either be muted or not defined to allow for carrier sensing, or only the second slot of the last DL sub-frames are muted or punctured for carrier sensing. The first slot of the last DL sub-frame can still be utilized for DL transmission such as for CRS, CSI-RS, PDSCH, PDCCH, PSS/SSS, PRS. For PDSCH, the DL transport block size as indicated by the "modulation and coding scheme" field of DL DCI format can be scaled down by half.

TABLE 2

An example of UL HARQ-ACK timing for LTE-U/LAA

| DL transport blocks (PDSCH) in | UL HARQ-ACK in |
|---|---|
| Sub-frame #0, #1 #2 | Sub-frame #7 |
| Sub-frame #3, #4, #5 | Sub-frame #8 |

When a LTE-U/LAA cell is a small cell where multipath propagation delay is small, a use of a special sub-frame 2320 in the above examples can be avoided as DL transmissions can interference with UL transmissions only for a small fraction of a sub-frame symbol. In that case, the special sub-frame 2320 in a configuration can be either a DL sub-frame 2315 or an UL sub-frame 2325. A UE 116 can be informed by another serving cell prior to configuration for communication with a LTE-U/LAA cell whether or not a configuration on the LTE-U/LAA cell includes a special sub-frame 2320.

Although examples to illustrate the principles of disclosure often utilize a 10 ms LTE-U/LAA frame, those skilled in the art would appreciate that the same principles can be applied to LTE-U/LAA frames with other durations. The descriptions and examples about the carrier sensing and idle period are also applicable to Embodiment 2.

In One Embodiment (Embodiment 2—LTE-U/LAA Frame with DL Sub-Frames and UL Sub-Frames for UCI and UL Traffic)

The LTE-U/LAA carrier can also be used to transmit UL data. The LTE-U/LAA frame structure as described in Embodiment 3 can apply where the UL sub-frames are also used for UEs to transmit data, that is, not limited to UCI.

For the LTE-U/LAA frame example in FIG. 23, HARQ-ACK in response to PUSCH transmissions from UE 116 can be transmitted on another serving cell, for example, the scheduling serving cell or the serving cell that transmits the UL grant, or on the LTE-U/LAA carrier in the first DL sub-frame that occurs at least 4 ms, for example, four sub-frames after the PUSCH transmission.

For the LTE-U/LAA frame 2600 example in FIG. 26, an example of HARQ-ACK timing for respective UL HARQ processes is given in TABLE 3.

TABLE 3

An example of DL HARQ-ACK timing for LTE-U/LAA

| UL transport blocks (PUSCH) in | DL HARQ-ACK (PHICH) in |
|---|---|
| Sub-frame #7 | Sub-frame #0 (next ON period) |
| Sub-frame #8 | Sub-frame #1 (next ON period) |
| Sub-frame #9 | Sub-frame #2 (next ON period) |

For the LTE-U/LAA frame example in FIG. 28, an example of the HARQ-ACK timing for UL HARQ processes is given in TABLE 4. Note that DL sub-frame #0 is not used for HARQ-ACK transmission in response to PUSCH reception in sub-frame #7 of the previous P-ON 610a period because in case of a continuous ON 605 period between successive LTE-U/LAA frames, the eNB 102 may not be able to process the UL transport block in two sub-frames, such as sub-frame #8 and sub-frame #9, and transmit a respective HARQ-ACK. Alternatively, the HARQ-ACK corresponding to PUSCH in sub-frame #7 and sub-frame #8 can still be transmitted in sub-frame #0 and sub-frame #1, respectively, if an eNB 102 processing time for an UL transport block after the reception of a respective PUSCH is 2 ms. In another alternative, the sub-frame of HARQ-ACK transmission depends on the idle period. For example, TABLE 4 is only applicable when the P-ON 610 period is continuous; otherwise, sub-frame #0 and sub-frame #1 are used for HARQ-ACK transmissions corresponding to PUSCH receptions in sub-frame #7 and sub-frame #8, respectively.

TABLE 4

An example of DL HARQ-ACK timing for LTE-U/LAA

| UL transport blocks (PUSCH) in | DL HARQ-ACK (PHICH) in |
|---|---|
| Sub-frame #7 | Sub-frame #1 (next ON period) |
| Sub-frame #8 | Sub-frame #2 (next ON period) |

For LTE-U/LAA frame 2800 example in FIG. 28 where the second slot of the last UL sub-frame is muted for carrier sensing, an example of the HARQ-ACK timing for respective UL HARQ processes is given in TABLE 3.

Due to the bursty nature of DL and UL traffic, embodiments of the present disclosure enable configuration of the DUUL sub-frame ratio by the network. Possible configurations include 100% DL sub-frames, 100% UL sub-frames, configurations as shown in Embodiment 3.

Embodiments of the present disclosure enable configurable LTE-U/LAA frame duration or P-ON 610 duration. The configuration can range from one sub-frame to ten sub-frames. By avoiding unnecessarily long channel reservation, the vacated channel can be used by other LTE-U/LAA cells or other Wi-Fi APs. For one and two sub-frames configuration, the sub-frames can be either only DL sub-frames or only UL sub-frames. For a configuration of three to ten sub-frames, a different DL-UL ratio can be configured. For DL-UL ratio of approximately 1 (~50% DL sub-frames and ~50% UL sub-frames), an example of DL-UL patterns as a function of the P-ON 610 duration configuration is shown in TABLE 5a, where D denotes DL sub-frame, U denotes UL sub-frame and S denotes special sub-frame. Depending upon the configured DL-UL ratio, the corresponding DL-UL patterns as a function of the P-ON 610 duration configuration can be constructed. In another example, the LTE-U/LAA frame configuration consists of the P-ON 610 duration and the location of the special sub-frame. An example of sub-frame #6 configured as a special sub-frame is indicated in TABLE 5b. For P-ON 610 duration configurations that do not include sub-frame #6 or include sub-frame #6 as the last sub-frame, the LTE-U/LAA frame can consist of only DL sub-frames, or even only UL sub-frames. Other configurations of special sub-frame location such as sub-frame #5, sub-frame #4, and the like, can also be possible.

TABLE 5a

DL-UL pattern for various ON duration configurations

| | ON duration | | | | | | | | | |
|---|---|---|---|---|---|---|---|---|---|---|
| | 1 | 2 | 3 | 4 | 5 | 6 | 7 | 8 | 9 | 10 |
| SF #0 | D/U | D/U | D | D | D | D | D | D | D | D |
| SF #1 | | D/U | S | D | D | D | D | D | D | D |
| SF #2 | | | U | S | S | D | D | D | D | D |
| SF #3 | | | | U | U | S | S | D | D | D |
| SF #4 | | | | | U | U | U | S | S | D |
| SF #5 | | | | | | U | U | U | U | S |
| SF #6 | | | | | | | U | U | U | U |
| SF #7 | | | | | | | | U | U | U |
| SF #8 | | | | | | | | | U | U |
| SF #9 | | | | | | | | | | U |

TABLE 5b

DL-UL pattern for various ON duration configurations

| | ON duration | | | | | | | | | |
|---|---|---|---|---|---|---|---|---|---|---|
| | 1 | 2 | 3 | 4 | 5 | 6 | 7 | 8 | 9 | 10 |
| SF #0 | D | D | D | D | D | D | D | D | D | D |
| SF #1 | | D | D | D | D | D | D | D | D | D |
| SF #2 | | | D | D | D | D | D | D | D | D |
| SF #3 | | | | D | D | D | D | D | D | D |
| SF #4 | | | | | D | D | D | D | D | D |
| SF #5 | | | | | | D | D | D | D | D |
| SF #6 | | | | | | | D/S | S | S | S |
| SF #7 | | | | | | | | U | U | U |
| SF #8 | | | | | | | | | U | U |
| SF #9 | | | | | | | | | | U |

When a LTE-U/LAA cell is a small cell where multipath propagation delay is small, a use of a special sub-frame 2320 can be avoided as DL transmissions can interference with UL transmissions only for a small fraction of a sub-frame symbol. In that case, the special sub-frame in a configuration can be either a DL sub-frame or an UL sub-frame. The UE 116 can be informed by another serving cell prior to configuration for communication with a LTE-U/LAA cell whether or not a configuration on the LTE-U/LAA cell includes a special sub-frame.

The sub-frames of a LTE-U/LAA frame can be indexed by assigning sub-frame index 0 to the first sub-frame of the LTE-U/LAA frame followed by sub-frame index 1 to the second sub-frame of the LTE-U/LAA frame, and so on. The LTE-U/LAA sub-frame index need not necessarily be aligned with the sub-frame index of another serving cell for a given time. The first sub-frame of a LTE-U/LAA frame can always be sub-frame #0 regardless of the length of the idle period. In another option, sub-frame #0 can only occur at 10 ms periodicity or at an integer multiple of 10 ms periodicity. This may cause some latency in utilizing an available channel, but keeping sub-frame index alignment between the LTE-U/LAA carrier and the carrier of the other serving cell can simplify carrier aggregation operation.

The configuration of the DL/UL ratio and/or special sub-frame location and/or the frame duration, or more generally, LTE-U/LAA frame configuration information, can be signaled by the network from another serving cell with UE-common or UE-specific signaling, such as using dynamic (L1) control channel (for example, (E)PDCCH), MAC CE or RRC signaling. They can also be signaled from the LTE-U/LAA carrier, such as using a UE-common or UE-specific dynamic (L1) control channel (for example, (E)PDCCH) in the first sub-frame of the LTE-U/LAA frame, assuming the first sub-frame is a DL sub-frame. For example, the CRC of the UE common (E)PDCCH can be scrambled with an RNTI value commonly configured or known to all UEs, including a new common RNTI. The CRC of the UE specific (E)PDCCH can be scrambled with an RNTI value uniquely configured to a UE, for example, C-RNTI. Furthermore, when the control signaling requires a certain decoding time, the minimum duration of a LTE-U/LAA frame can be equal to or larger than the minimum control signaling decoding time. For example, when the control signaling takes less than M ms to be received and decoded and its contents applied by the UE, then duration of M ms or more can be supported, that is, a configuration with duration less than M ms is not supported. The DL-UL pattern for the M ms can be fixed, for example, DL sub-frames only in the first M ms of LTE-U/LAA frame. In one example, if 3 ms is needed for receiving and decoding a control signal and applying its conveyed information, the DL-UL pattern shown in TABLE 5a can be modified as shown in TABLE 5c. ON duration of 1 ms and 2 ms are not applicable in this case.

TABLE 5c

DL-UL pattern for various ON duration configurations

| | ON duration | | | | | | | | | |
|---|---|---|---|---|---|---|---|---|---|---|
| | 1 | 2 | 3 | 4 | 5 | 6 | 7 | 8 | 9 | 10 |
| SF #0 | N/A | N/A | D | D | D | D | D | D | D | D |
| SF #1 | | N/A | D | D | D | D | D | D | D | D |
| SF #2 | | | D | D | D | D | D | D | D | D |
| SF #3 | | | | D/S | S | S | S | D | D | D |
| SF #4 | | | | | U | U | U | S | S | D |
| SF #5 | | | | | | U | U | U | U | S |
| SF #6 | | | | | | | U | U | U | U |
| SF #7 | | | | | | | | U | U | U |
| SF #8 | | | | | | | | | U | U |
| SF #9 | | | | | | | | | | U |

In one example of an LTE-U/LAA DL-UL pattern configuration, multiple cells, for example within a small cell coordination cluster, align their DL-UL configurations over a backhaul link in order to reduce the inter-duplex mode interference. In this case multiple P-ON 610 duration configurations can be multiplexed within a single LTE-U/LAA frame or across multiple LTE-U/LAA frames. For example, Cell A can indicate a primary P-ON 610 duration of 4 ms with a DL-UL pattern according to TABLE 5a. Since in this example sub-frames #4 to #9 are unoccupied by transmissions from Cell A, other Cells transmitting LTE-U/LAA signals, or other unlicensed wireless UEs can utilize the available sub-frames for transmission.

In one alternative, the other cells, for example a Cell B, can transmit an LTE-U/LAA frame starting at a time subsequent to the end of the ON duration indicated by Cell A. As mentioned previously, the sub-frame numbers between Cell A and Cell B need not be aligned and Cell B can select one of the possible P-ON 610 durations for the LTE-U/LAA frame transmission starting from SF#0, denoted as a secondary P-ON 610 duration.

In one example, the secondary P-ON 610 duration M' by Cell B is selected such that M+M'=10, where M is the P-ON 610 duration selected by Cell A. This selection is beneficial in case of a high-level of coordination between Cell A and Cell B, wherein the knowledge of the P-ON 610 duration selected can be shared between the cells reducing the delay of Cell B in transmitting during a LTE-U/LAA frame duration. TABLE 5d provides examples of the secondary P-ON 610 duration for Cell B, where Cell A P-ON 610 durations are selected based on TABLES 5a-5c.

TABLE 5d

DL-UL pattern for various secondary ON duration configurations

| | ON duration | | | | | | | | |
|---|---|---|---|---|---|---|---|---|---|
| 1 | 2 | 3 | 4 | 5 | 6 | 7 | 8 | 9 | 10 |
| SF #0 | | | | | | | | | N/A |
| SF #1 D | | | | | | | | | N/A |
| SF #2 D | D | | | | | | | | N/A |
| SF #3 D | D | D | | | | | | | N/A |
| SF #4 D | D | D | D | | | | | | N/A |
| SF #5 S | D | D | D | D | | | | | N/A |
| SF #6 U | S | S | D | D | D | | | | N/A |
| SF #7 U | U | U | S | S | D | D | | | N/A |
| SF #8 U | U | U | U | U | S | S | D/U | | N/A |
| SF #9 U | U | U | U | U | U | U | D/U | D/U | N/A |

In a second example, the secondary P-ON 610 duration M' by Cell B is selected such that M+M'<10, where M is the P-ON 610 duration selected by Cell A. This selection is beneficial in case of limited coordination between Cell A and Cell B, or in case carrier sensing is required to detect either the end of the transmission from Cell A or to determine the primary P-ON 610 duration selected by Cell A, introducing some delay for Cell B in transmitting during a LTE-U/LAA frame duration. TABLE 5e provides examples of the secondary P-ON 610 duration for Cell B, where M+M'=9 and 1 sub-frame is left blank between the transmissions of Cell A and Cell B for the purpose of carrier sensing or due to LBT requirements. Cell A P-ON 610 durations can be selected based on TABLES 5a-5c.

TABLE 5e

DL-UL pattern for various secondary ON duration configurations

| | ON duration | | | | | | | | |
|---|---|---|---|---|---|---|---|---|---|
| 1 | 2 | 3 | 4 | 5 | 6 | 7 | 8 | 9 | 10 |
| SF #0 | | | | | | | | N/A | N/A |
| SF #1 | | | | | | | | N/A | N/A |
| SF #2 D | | | | | | | | N/A | N/A |
| SF #3 D | D | | | | | | | N/A | N/A |
| SF #4 D | D | D | | | | | | N/A | N/A |
| SF #5 D | D | D | D | | | | | N/A | N/A |
| SF #6 S | S | S | D | D | | | | N/A | N/A |
| SF #7 U | U | U | S | S | D | | | N/A | N/A |
| SF #8 U | U | U | U | U | S | D/U | | N/A | N/A |
| SF #9 U | U | U | U | U | U | D/U | D/U | N/A | N/A |

In a third example, TABLE 5f provides examples of the secondary P-ON 610 duration for Cell B, where M+M'=8 and one sub-frame is left blank between the transmissions of Cell A and Cell B and SF #9 is left blank for the purpose of carrier sensing or due to LBT requirements. Cell A P-ON 610 durations can be selected based on TABLES 5a-5c.

TABLE 5f

DL-UL pattern for various secondary ON duration configurations

| | ON duration | | | | | | | | |
|---|---|---|---|---|---|---|---|---|---|
| 1 | 2 | 3 | 4 | 5 | 6 | 7 | 8 | 9 | 10 |
| SF #0 | | | | | | | N/A | N/A | N/A |
| SF #1 | | | | | | | N/A | N/A | N/A |
| SF #2 D | | | | | | | N/A | N/A | N/A |
| SF #3 D | D | | | | | | N/A | N/A | N/A |
| SF #4 D | D | D | | | | | N/A | N/A | N/A |
| SF #5 D | D | D | D | | | | N/A | N/A | N/A |
| SF #6 S | S | S | D | D | | | N/A | N/A | N/A |
| SF #7 U | U | U | S | S | D/U | | N/A | N/A | N/A |
| SF #8 U | U | U | U | U | D/U | D/U | N/A | N/A | N/A |
| SF #9 | | | | | | | N/A | N/A | N/A |

In a fourth example, TABLE 5g provides examples of the secondary P-ON 610 duration for Cell B, where the secondary P-ON 610 duration is fixed at three sub-frames and is always transmitted in SF #6, #7, and #8. One benefit of fixed secondary allocation is to reduce the complexity of neighboring cell measurements for the purposes of interference or mobility management in the case where inter-cell or inter-operator coordination is limited.

TABLE 5g

DL-UL pattern for various secondary ON duration configurations

| | ON duration | | | | | | | | |
|---|---|---|---|---|---|---|---|---|---|
| 1 | 2 | 3 | 4 | 5 | 6 | 7 | 8 | 9 | 10 |
| SF #0 | | | | | N/A | N/A | N/A | N/A | N/A |
| SF #1 | | | | | N/A | N/A | N/A | N/A | N/A |
| SF #2 | | | | | N/A | N/A | N/A | N/A | N/A |
| SF #3 | | | | | N/A | N/A | N/A | N/A | N/A |
| SF #4 | | | | | N/A | N/A | N/A | N/A | N/A |
| SF #5 | | | | | N/A | N/A | N/A | N/A | N/A |
| SF #6 D | D | D | D | D | N/A | N/A | N/A | N/A | N/A |
| SF #7 S | S | S | S | S | N/A | N/A | N/A | N/A | N/A |
| SF #8 U | U | U | U | U | N/A | N/A | N/A | N/A | N/A |
| SF #9 | | | | | N/A | N/A | N/A | N/A | N/A |

It is noted that the example configurations applied above can be extended to include any feasible DL-UL and special sub-frame 2320 combinations such that M+M'≤10 and subject to constraints of blank sub-frames 0≤B≤10, such that M+M'+B<=10. Additionally, the primary and secondary configurations can be extended beyond a single LTE-U/LAA frame to multiples of LTE-U/LAA frames, or to an arbitrary length X. M and M' can be chosen such at M+M'≤X or can be periodically repeated such that aM+bM'≤X where a and b are the number of repetitions of the primary and secondary ON duration periods respectively.

Additionally the primary and secondary P-ON 610 duration configurations can be shared between eNBs to facilitate configuration selection. The configurations can be shared by one or more means such as, for example, over the X2 interface, over-the-air signaling, or relayed by eNB 102 or UE 116 via higher layer signaling. The knowledge of configurations can provide references for configuring measurements for neighboring cells for the purposes of interference and mobility management. For example, using TABLE 5g, Cell A can configure UEs with DL measurements in SF#6 since when Cell B transmits during a secondary P-ON 610 duration, it will have a DL sub-frame configured in SF #6 regardless of the configuration of Cell A.

Figure 29:
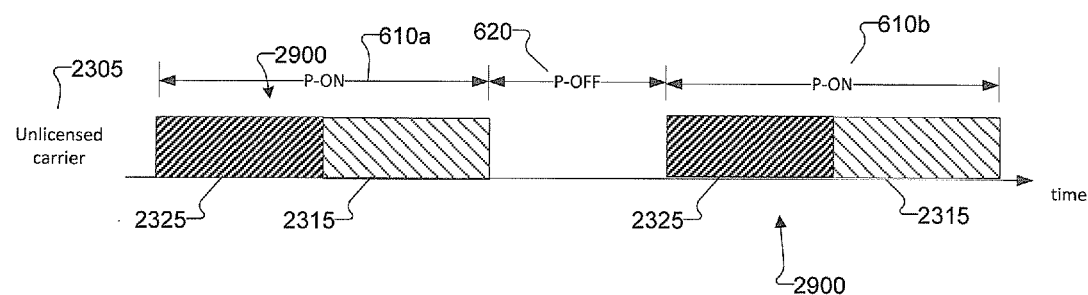
FIGS. 29 and 30 illustrate examples of an LTE-U/LAA frame according to this disclosure.

FIG. 29 illustrates another example of an LTE-U/LAA frame according to this disclosure. The embodiment of the LTE-U/LAA frame 2900 shown in FIG. 29 is for illustration only. Other embodiments could be used without departing from the scope of the present disclosure.

In another example of an LTE-U/LAA frame, the LTE-U/LAA frame 2900 includes a set of UL sub-frames 2325, followed by a set of DL sub-frames 2315. Specifically, a configuration can be that sub-frames #0 to #4 are UL sub-frames 2325 and sub-frames #5 to #9 are DL sub-frames 2315. In this case, the SSS can be present in sub-frame #5 and the PSS can be present in either sub-frame #5 (if FDD design is followed) or sub-frame #6 (if TDD design is followed). Examples of UL HARQ-ACK timing and DL HARQ-ACK timing are given in TABLE 6 and TABLE 7, respectively. If the last sub-frame of the LTE-U/LAA frame 2900 is used for carrier sensing, the last row of TABLE 6 is not relevant and an example of DL HARQ-ACK timing can be as in TABLE 8 where two Physical Hybrid ARQ Indicator Channel (PHICH) resources in sub-frame #8 are used to carry DL HARQ-ACK for sub-frame #3 and sub-frame #4. Alternatively, a single PHICH resource in sub-frame #8 is used to convey HARQ-ACK for sub-frame #3 and sub-frame #4 by applying HARQ-ACK bundling.

TABLE 6

An example of UL HARQ-ACK timing for LTE-U/LAA

| DL transport blocks (PDSCH) in | UL HARQ-ACK in |
| --- | --- |
| Sub-frame #5 | Sub-frame #0 (next ON period) |
| Sub-frame #6 | Sub-frame #1 (next ON period) |
| Sub-frame #7 | Sub-frame #2 (next ON period) |
| Sub-frame #8 | Sub-frame #3 (next ON period) |
| Sub-frame #9 | Sub-frame #4 (next ON period) |

TABLE 7

An example of DL HARQ-ACK timing for LTE-U

| UL transport blocks (PUSCH) in | DL HARQ-ACK (PHICH) in |
| --- | --- |
| Sub-frame #0 | Sub-frame #5 |
| Sub-frame #1 | Sub-frame #6 |
| Sub-frame #2 | Sub-frame #7 |
| Sub-frame #3 | Sub-frame #8 |
| Sub-frame #4 | Sub-frame #9 |

TABLE 8

An example of DL HARQ-ACK timing for LTE-U

| UL transport blocks (PUSCH) in | DL HARQ-ACK (PHICH) in |
| --- | --- |
| Sub-frame #0 | Sub-frame #5 |
| Sub-frame #1 | Sub-frame #6 |
| Sub-frame #2 | Sub-frame #7 |
| Sub-frame #3 | Sub-frame #8 |
| Sub-frame #4 | Sub-frame #8 |

Figure 30:
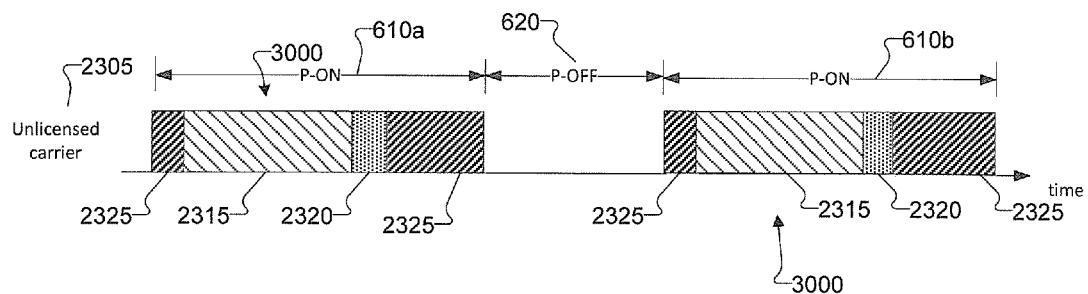

FIG. 30 illustrates another example of an LTE-U/LAA frame according to this disclosure. The embodiment of the LTE-U/LAA frame 3000 shown in FIG. 30 is for illustration only. Other embodiments could be used without departing from the scope of the present disclosure.

In another example, a LTE-U/LAA frame 3000 can begin with an UL sub-frame 2325, followed by a set of DL sub-frames 2315, followed by a special sub-frame 2320, followed by a set of UL sub-frames 2325. The UL sub-frame 2325 in the beginning of every LTE-U/LAA frame 2300 can be specifically used to transmit SRS and CSI, thereby providing the network with a more up-to-date CSI for MCS determination for the subsequent DL transmissions in DL sub-frames 2315 (CSI such as CQI can be obtained from measurement of a discovery reference signal during the P-OFF period), or to provide HARQ-ACK information for DL transport blocks transmitted to UE 116 in the previous P-ON 610a duration but did not have a respective HARQ-ACK transmission by the UE 116 due to a shortage of processing time. Examples of UL HARQ-ACK timing and DL HARQ-ACK timing are given in TABLE 9 and Table 10, respectively.

TABLE 9

An example of UL HARQ-ACK timing for LTE-U/LAA

| DL transport blocks (PDSCH) in | UL HARQ-ACK in |
| --- | --- |
| Sub-frame #1, #2, #3 | Sub-frame #8 |
| Sub-frame #4, #5 | Sub-frame #9 |

TABLE 10

An example of DL HARQ-ACK timing for LTE-U/LAA

| UL transport blocks (PUSCH) in | DL HARQ-ACK (PHICH) in |
| --- | --- |
| Sub-frame #0 | Sub-frame #4 |
| Sub-frame #8 | Sub-frame #1 (next ON period) |
| Sub-frame #9 | Sub-frame #2 (next ON period) |

In another example, the first sub-frame of the LTE-U/LAA frame is a DL sub-frame 2315 but the first OFDM symbol or the first few OFDM symbols can be punctured to enable SRS transmissions by UEs. For example, the first sub-frame, which is UL sub-frame 2325, occupies only one OFDM symbol or a few OFDM symbols in the sub-frame. The punctured symbol(s) can be different for different cells and can be configured to the UE 116 by higher layer signaling for the cell using the LTE-U/LAA carrier 2305 or be implicitly determined from the associated cell identity. PDSCH can still be transmitted in the remaining symbols of the first sub-frame. The HARQ timing can be the same as that of the examples where the first sub-frame is purely DL. Such an approach can be applicable, for example, when PDSCH is scheduled from a different serving cell or when PDSCH is scheduled by EPDCCH. A SRS transmission from UE 116 can serve to provide both an estimate of the channel the UE 116 experience for DL receptions on the LTE-U/LAA carrier as well as an estimate of the corresponding interference if SRS transmissions are coordinated among neighboring cells to occur in different OFDM symbols.

It is noted that the primary and secondary P-ON 610 durations as described previously in the case of DL sub-frames preceding UL sub-frames can also be applied to the UL-DL configurations of the LTE-U/LAA frames as described above where UL sub-frames precede DL sub-frames.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) comprising:
at least one antenna configured to communicate with a base station; and
processing circuitry configured to receive data and control information through the at least one antenna, the data and control information received in an unlicensed frame on an unlicensed spectrum carrier, the unlicensed frame comprising a number of downlink (DL) sub-frames followed by special sub-frame followed by an uplink (UL) sub-frame,
wherein the unlicensed frame is not aligned with a primary cell (Pcell) frame, and
wherein a duration of the unlicensed frame is signaled from the unlicensed spectrum carrier using a UE-common or a UE-specific (E)PDCCH, in a first DL sub-frame of the unlicensed frame.

2. The UE as set forth in claim 1, wherein mapping of signals is according to a timing of the unlicensed frame.

3. The UE as set forth in claim 1, wherein the duration of the unlicensed frame is fixed, or signaled by another serving cell.

4. The UE as set forth in claim 1, wherein the number of DL sub-frames comprises a first six sub-frames and the special sub-frame comprise one sub-frame followed by three UL sub-frames, and wherein a duration of the unlicensed frame is ten milliseconds.

5. The UE as set forth in claim 1, wherein the processing circuitry is configured to perform an UL hybrid automatic repeat request (HARQ) process, and wherein a UL HARQ timing is as follows: for DL transport blocks received in DL sub-frame #0 and DL sub-frame #1 a UL HARQ acknowledgement (ACK) is transmitted in UL sub-frame #7, for DL transport blocks received in DL sub-frame #2 and DL sub-frame #3 the UL HARQ ACK is transmitted in UL sub-frame #8, and for DL transport blocks received in DL sub-frame #4 and DL sub-frame #5 the UL HARQ ACK is transmitted in UL sub-frame #9.

6. The UE as set forth in claim 1, wherein the unlicensed frame comprises a DL-UL pattern configuration, wherein depending upon a configured DL-UL ratio, the DL-UL pattern is a function of an ON duration configuration.

7. The UE as set forth in claim 6, wherein the DL-UL pattern configuration is according to:

|       | ON duration | | | | | | | | | |
|-------|---|---|---|---|---|---|---|---|---|---|
|       | 1 | 2 | 3 | 4 | 5 | 6 | 7 | 8 | 9 | 10 |
| SF #0 | D/U | D/U | D | D | D | D | D | D | D | D |
| SF #1 |     | D/U | S | D | D | D | D | D | D | D |
| SF #2 |     |     | U | S | S | D | D | D | D | D |
| SF #3 |     |     |   | U | U | S | S | D | D | D |
| SF #4 |     |     |   |   | U | U | U | S | S | D |
| SF #5 |     |     |   |   |   | U | U | U | U | S |
| SF #6 |     |     |   |   |   |   | U | U | U | U |
| SF #7 |     |     |   |   |   |   |   | U | U | U |
| SF #8 |     |     |   |   |   |   |   |   | U | U |
| SF #9 |     |     |   |   |   |   |   |   |   | U. |

8. The UE as set forth in claim 6, wherein at least one of: a configuration of the DL-UL ratio, a special sub-frame location, or the unlicensed frame duration, or unlicensed frame configuration information, is signaled from another serving cell with UE-common or UE-specific signaling or signaled from the unlicensed spectrum carrier.

9. A method comprising:
receiving data and control information through at least one antenna, the data and control information received in an unlicensed frame on an unlicensed spectrum carrier, the unlicensed frame comprising a number of downlink (DL) sub-frames followed by special sub-frame followed by an uplink (UL) sub-frame,
wherein the unlicensed frame is not aligned with a primary cell (Pcell) frame, and
wherein a duration of the unlicensed frame is signaled from the unlicensed spectrum carrier using a UE-common or a UE-specific (E)PDCCH, in a first DL sub-frame of the unlicensed frame.

10. The method as set forth in claim 9, wherein mapping of signals is according to a timing of the unlicensed frame.

11. The method as set forth in claim 9, wherein at least one of:
the duration of the unlicensed frame is fixed, or signaled by another serving cell; or
the number of DL sub-frames comprises a first six sub-frames and the special sub-frame comprise one sub-frame followed by three UL sub-frames, and wherein a duration of the unlicensed frame is ten milliseconds.

12. The method as set forth in claim 9, further comprising:
performing an UL hybrid automatic repeat request (HARQ) process, wherein a UL HARQ timing is as follows: for DL transport blocks received in DL sub-frame #0 and DL sub-frame #1 a UL HARQ acknowledgement (ACK) is transmitted in UL sub-frame #7, for DL transport blocks received in DL sub-frame #2 and DL sub-frame #3 the UL HARQ ACK is transmitted in UL sub-frame #8, and for DL transport blocks received in DL sub-frame #4 and DL sub-frame #5 the UL HARQ ACK is transmitted in UL sub-frame #9.

13. The method as set forth in claim 9, wherein the unlicensed frame comprises a DL-UL pattern configuration, wherein depending upon a configured DL-UL ratio, the DL-UL pattern is a function of an ON duration configuration, and
wherein at least one of: a configuration of the DL-UL ratio, a special sub-frame location, or the unlicensed frame duration, or unlicensed frame configuration information, is signaled from another serving cell with UE-common or UE-specific signaling or signaled from the unlicensed spectrum carrier.

14. A base station (BS) comprising:
at least one antenna configured to communicate with a user equipment (UE); and processing circuitry configured to send data and control information through the at least one antenna in an unlicensed frame on an unlicensed spectrum carrier, the unlicensed frame comprising a number of downlink (DL) sub-frames followed by special sub-frame followed by an uplink (UL) sub-frame, wherein the unlicensed frame is not aligned with a primary cell (Pcell) frame, and wherein a duration of the unlicensed frame is signaled from the unlicensed spectrum carrier using a UE-common or a UE-specific (E)PDCCH, in a first DL sub-frame of the unlicensed frame.

15. The BS as set forth in claim 14, wherein mapping of signals is according to a timing of the unlicensed frame.

16. The BS as set forth in claim 14, wherein at least one of:
the duration of the unlicensed frame fixed, or signaled by another serving cell; or
the number of DL sub-frames comprises a first six sub-frames and the special sub-frame comprise one sub-frame followed by three UL sub-frames, and wherein a duration of the unlicensed frame is ten milliseconds.

17. The BS as set forth in claim 14, wherein the unlicensed frame comprises a DL-UL pattern configuration, wherein depending upon a configured DL-UL ratio, the DL-UL pattern is a function of an ON duration configuration.

18. The BS as set forth in claim 17, wherein at least one of: a configuration of the DL-UL ratio, a special sub-frame location, or the unlicensed frame duration, or unlicensed frame configuration information, is signaled from another serving cell with UE-common or UE-specific signaling or signaled from the unlicensed spectrum carrier.

* * * * *